(12) United States Patent
Ogata et al.

(10) Patent No.: US 11,284,196 B2
(45) Date of Patent: Mar. 22, 2022

(54) VIBRATION DEVICE

(71) Applicant: DAI-ICHI SEIKO CO., LTD., Kyoto (JP)

(72) Inventors: Kenji Ogata, Ogori (JP); Shogo Kurogi, Ogori (JP); Keita Matsuoka, Ogori (JP); Yoshiyuki Watanabe, Takasaki (JP)

(73) Assignee: DAI-ICHI SEIKO CO., LTD., Kyoto (JP)

( * ) Notice: Subject to any disclaimer, the term of this patent is extended or adjusted under 35 U.S.C. 154(b) by 557 days.

(21) Appl. No.: 16/314,300

(22) PCT Filed: Jul. 14, 2017

(86) PCT No.: PCT/JP2017/025787
§ 371 (c)(1),
(2) Date: Dec. 28, 2018

(87) PCT Pub. No.: WO2018/021075
PCT Pub. Date: Feb. 1, 2018

(65) Prior Publication Data
US 2021/0227329 A1 Jul. 22, 2021

(30) Foreign Application Priority Data

Jul. 29, 2016 (JP) .............................. JP2016-150162
Oct. 26, 2016 (JP) .............................. JP2016-210049

(51) Int. Cl.
*H04R 17/00* (2006.01)
*H04R 7/06* (2006.01)
(52) U.S. Cl.
CPC ............... *H04R 7/06* (2013.01); *H04R 17/00* (2013.01)

(58) Field of Classification Search
CPC ........ H04R 17/00; H04R 7/06; H04R 31/006; H04R 2460/13; H04R 17/10; H04R 25/606; H04R 7/10; H02N 2/18; H02N 2/04
See application file for complete search history.

(56) References Cited

U.S. PATENT DOCUMENTS

| 2001/0033669 A1 | 10/2001 | Bank et al. |
| 2005/0023937 A1 | 2/2005 | Sashida et al. |

(Continued)

FOREIGN PATENT DOCUMENTS

| JP | S56-116398 A | 9/1981 |
| JP | S62-259026 A | 11/1987 |

(Continued)

OTHER PUBLICATIONS

Notice of Reasons for Refusal (JP Patent Application No. 2018-529786); dated Nov. 26, 2019; 12 pages.

(Continued)

*Primary Examiner* — Matthew A Eason
(74) *Attorney, Agent, or Firm* — Howard & Howard Attorneys PLLC

(57) ABSTRACT

Diaphragms (4, 5, 6, 7) each include laminated layers including a piezoelectric layer. The diaphragms (4, 5, 6, 7) are each warped to oscillate due to expansion and contraction of the piezoelectric layer or due to an oscillatory force from the outside. The diaphragms have mutually different resonance frequencies. A casing (2) has an internal space (2C) for accommodating the diaphragms (4, 5, 6, 7) and a fixing part (2D) for fixing a portion of each of the diaphragms (4, 5, 6, 7). The casing (2) transmits oscillations between the diaphragms (4, 5, 6, 7) and the outside via the fixing part (2D).

31 Claims, 45 Drawing Sheets

(56) References Cited

U.S. PATENT DOCUMENTS

| | | | | |
|---|---|---|---|---|
| 2005/0094843 A1* | 5/2005 | Soto-Nicolas | ......... | H04R 17/00 381/423 |
| 2006/0156821 A1 | 7/2006 | Itoh et al. | | |
| 2007/0013270 A1 | 1/2007 | Sashida et al. | | |
| 2007/0086616 A1 | 4/2007 | Bank et al. | | |

FOREIGN PATENT DOCUMENTS

| | | | |
|---|---|---|---|
| JP | H09163477 | A | 6/1997 |
| JP | 2003-520540 | A | 7/2003 |
| JP | 2003274470 | A | 9/2003 |
| JP | 2005-045691 | A | 2/2005 |
| JP | 2006-200976 | A | 8/2006 |
| JP | 2006237792 | A | 9/2006 |
| JP | 2012-210091 | A | 10/2012 |
| JP | 2014-107828 | A | 6/2014 |
| JP | 2016034075 | A | 3/2016 |

OTHER PUBLICATIONS

International Search Report and Written Opinion (Internation Application No. PCT/JP2017/025787); dated Sep. 26, 2017; 9 pages.

\* cited by examiner

VIBRATION DEVICE

CROSS-REFERENCE TO RELATED APPLICATIONS

This application is a national phase application of International Patent Application No. PCT/JP2017/025787, filed Jul. 14, 2017, which claims priority to JP Patent Application No. 2016-150162, filed Jul. 29, 2016 and JP Patent Application No. 2016-210049, filed Oct. 26, 2016, the disclosures of which are hereby incorporated by reference in their entirety.

TECHNICAL FIELD

The present disclosure relates to a vibration device.

BACKGROUND ART

Bone conduction earphones have been developed that transmit oscillations of oscillators in accordance with sound to a cranial bone without passing through an eardrum and thus transmit the oscillations to the internal ear as sound (for example, refer to Patent Literature 1). In addition, vibration power generators have been developed that generate electric power based on oscillations of oscillators including piezoelectric elements (for example, refer to Patent Literature 2).

CITATION LIST

Patent Literature

Patent Literature 1: Unexamined Japanese Patent Application Kokai Publication No. 2014-107828
Patent Literature 2: Unexamined Japanese Patent Application Kokai Publication No. 2012-210091

SUMMARY OF INVENTION

Technical Problem

Each of the bone conduction earphone disclosed in Patent Literature 1 and the vibration power generator disclosed in Patent Literature 2 is equipped with a single oscillator. In this configuration, the frequency band that can provide a large oscillation displacement of the oscillator is limited to the vicinity of the resonance frequency (characteristic frequency) of the oscillator. It is thus difficult to obtain a sufficient amplitude of oscillations of a casing corresponding to sound in a frequency band different from the resonance frequency or to obtain a sufficient electric power generated based on the oscillations in a frequency band different from the resonance frequency.

An objective of the disclosure, which has been accomplished to solve the above problems, is to provide a vibration device that can achieve a sufficient amplitude of oscillations of a casing corresponding to sound and can generate a sufficient electric power.

Solution to Problem

In order to achieve the above objective, a vibration device according to an embodiment of the disclosure includes: diaphragms each including laminated layers that include a piezoelectric layer and being warped to oscillate due to expansion and contraction of the piezoelectric layer or due to an oscillatory force from the outside, the diaphragms having mutually different resonance frequencies; and a casing including an internal space for accommodating the diaphragms and a fixing part for fixing a portion of each of the diaphragms, the casing being able to transmit oscillations between the diaphragms and the outside via the fixing part.

In this configuration, the diaphragms may include a diaphragm having an entire width longer than an entire width of a fixed end of the diaphragm in a direction orthogonal to a direction extending from the fixing part toward a center of the diaphragm in a main surface of the diaphragm, the fixed end being fixed by the fixing part.

The diaphragms may be arranged in the same plane.

The diaphragms may include a diaphragm having a main surface a part of which is cut out to define an opening, the opening surrounding another diaphragm.

The diaphragms may be concentrically arranged.

The opening may be deviated from the center of the main surface toward the fixing part.

The diaphragms may be arc plates having the same central angle, the diaphragms being arranged in a radial direction of a circle centered on a reference point, and each of the diaphragms may be fixed by the fixing part at both ends.

The diaphragms may have portions to be fixed by the fixing part, the portions extending oppositely or radially from the reference point.

Each of the diaphragms may include: two first straight sections extending parallel to each other, each of the first straight sections being fixed by the fixing part at one end; and a second straight section coupling another end of one of the two first straight sections to another end of the other of the two first straight sections, and the diaphragms may be arranged such that a diaphragm is included inside a frame defined by the first straight sections and the second straight section of another diaphragm.

The diaphragms may be integrated with each other at portions to be fixed by the fixing part.

The diaphragms may be arranged in the thickness direction.

The diaphragms may have a same external dimension.

The diaphragms may be arranged in ascending or descending order of areas of main surfaces of the diaphragms.

The diaphragms may be arranged in ascending or descending order of thicknesses of the diaphragms.

Each of the diaphragms may be provided with a weight.

The diaphragms may be arranged in ascending or descending order of weights of the weights provided to the respective diaphragms.

The weight may be disposed on a center line in each of the diaphragms, the center line extending from the fixing part through the center of the diaphragm.

The weight may be disposed at a position deviated from a center line in each of the diaphragms, the center line extending from the fixing part through the center of the diaphragm.

The vibration device may further include an input-output unit that receives a voltage signal output by an external device and applies the voltage signal to the respective piezoelectric layers of the diaphragms or that extracts, as current, electric charges generated in the piezoelectric layers.

The fixing part may be disposed at a position opposite to the input-output unit.

At least one of the diaphragms may have a cut-out portion that faces the input-output unit.

At least one of the diaphragms may have a main surface having a C-shape, a U-shape, or a recessed shape.

The vibration device may further include another diaphragm having a same resonance frequency as one of the diaphragms.

The intervals between the resonance frequencies of the diaphragms may be determined such that a frequency response between adjacent resonance frequencies exceeds a frequency response of a single diaphragm.

A metal plate may be laminated to a portion of a main surface of at least one of the diaphragms The diaphragm to which the metal plate is laminated may have an annular shape, and the metal plate may extend along an inner periphery of the diaphragm in a circumferential direction.

The diaphragm to which the metal plate is laminated may have an annular shape, and the metal plate may include narrower sections and broader sections that adjoin each other in an alternate manner in a circumferential direction of the diaphragm.

The diaphragm to which the metal plate is laminated may have an annular shape, the metal plate may extend in a circumferential direction of the diaphragm, and the metal plate may have a width that decreases as a distance from the fixing part increases.

At least one of the diaphragms may be an annular plate including narrower and thinner sections and broader and thicker sections that adjoin each other in an alternate manner in the circumferential direction of the diaphragm.

The at least one of the diaphragms may be coupled to a metal weight at a position most distant from the fixing part.

The metal weight may protrude from the position coupled to the diaphragm in a direction along and parallel to the diaphragm.

Advantageous Effects of Invention

According to the embodiment of the disclosure, the diaphragms have mutually different resonance frequencies. This configuration can broaden the frequency band of electrical signals for causing oscillations of the diaphragms or the frequency band of oscillatory force from the outside, which can provide large oscillations of the casing or a large electric power generated in the piezoelectric layer. The configuration can thus achieve a sufficient amplitude of oscillations corresponding to sound or can generate a sufficient electric power.

DESCRIPTION OF EMBODIMENTS

Embodiments of the disclosure will now be described in detail with reference to the accompanying drawings. In these drawings, the identical components are provided with the same reference symbol.

Embodiment 1

First, Embodiment 1 of the disclosure will now be described.

Figure 1:
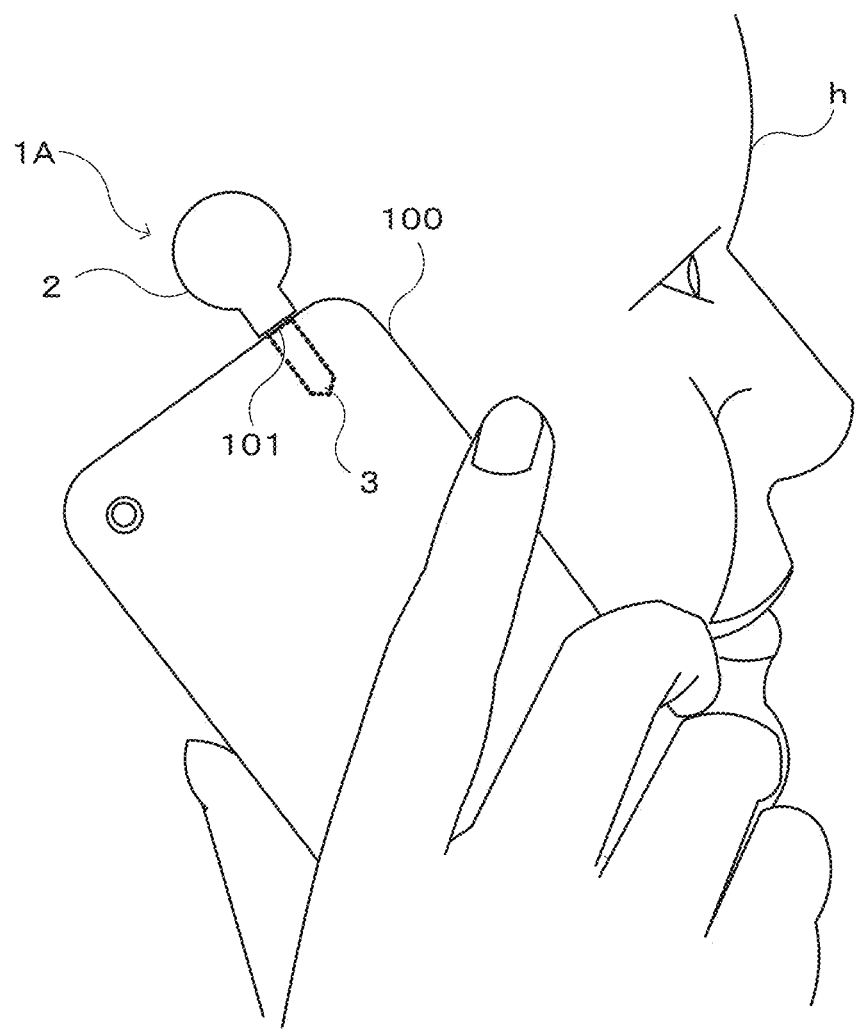
FIG. 1 illustrates a state of a phone call with a smartphone equipped with a bone conduction earphone according to Embodiment 1 of the disclosure.

With reference to FIG. 1, a bone conduction earphone 1A, which is a vibration device according this embodiment, includes a casing 2 functioning as a housing and a signal input unit (input-output unit) 3 protruding from the casing 2. The bone conduction earphone 1A is used after the signal input unit 3 is inserted into an earphone jack 101, which is an audio output terminal of a portable device (for example, a smartphone) 100 functioning as an external device. The casing 2 is composed of, for example, a material (for example, a resin) that can readily transmit acoustic oscillations and that a human body can safely touch.

The bone conduction earphone 1A accommodates a plurality of diaphragms (refer to FIG. 3) having mutually different resonance frequencies. The diaphragms cause the casing 2 to oscillate in accordance with audio voltage signals output from the earphone jack 101. Accordingly, if a user h holds the smartphone 100 while keeping the casing 2 in contact with the skin of the head of the user h, the oscillations of the casing 2 are transmitted as acoustic oscillations via the cranial bone to an internal ear. That is, the bone conduction earphone 1A can be used without being inserted into an external auditory canal of the user h. The configurations and operations of the bone conduction earphone 1A will be explained in detail.

Figure 2:
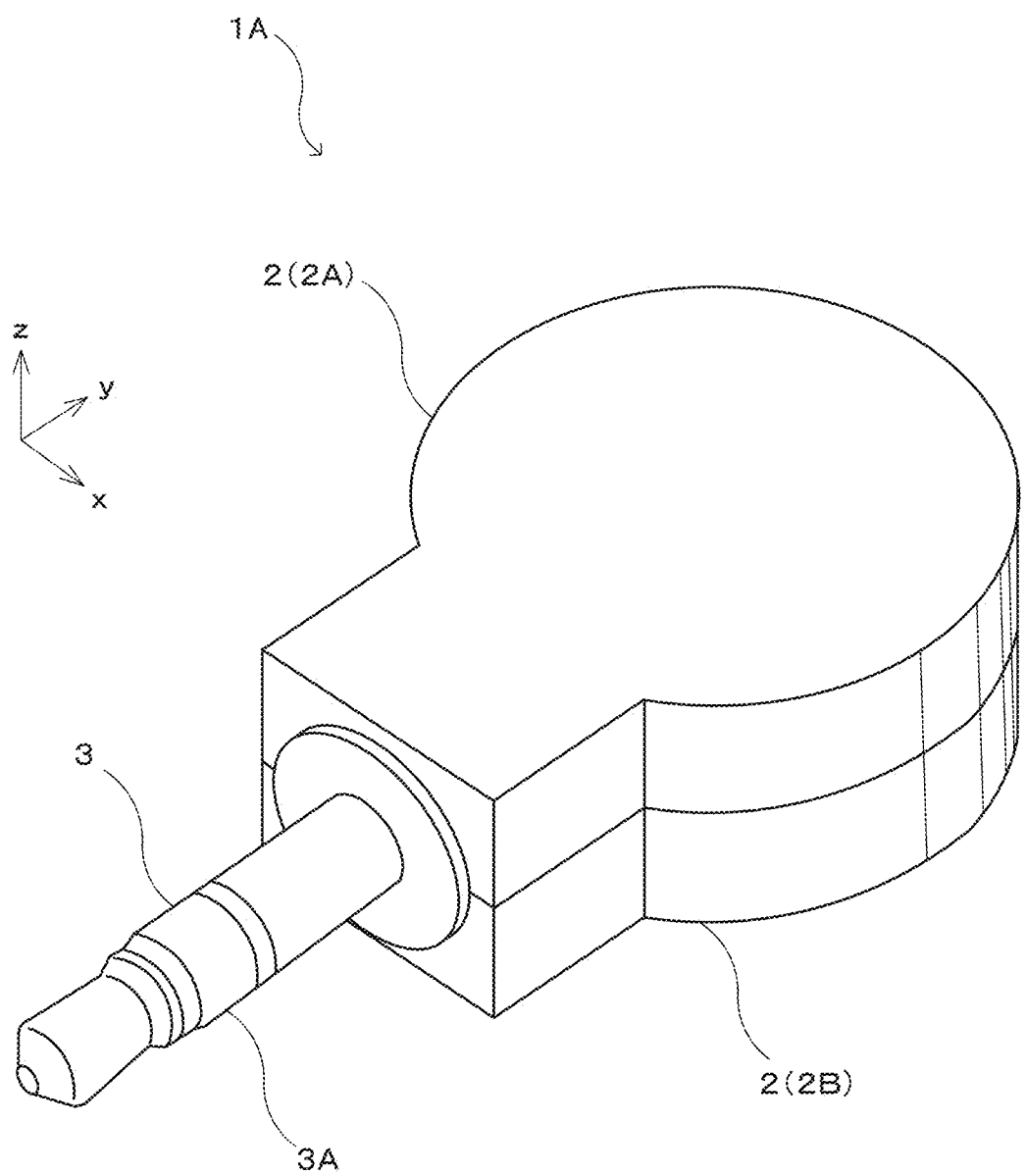
FIG. 2 is a perspective view of the appearance of the bone conduction earphone according to Embodiment 1 of the disclosure.
Figure 3:
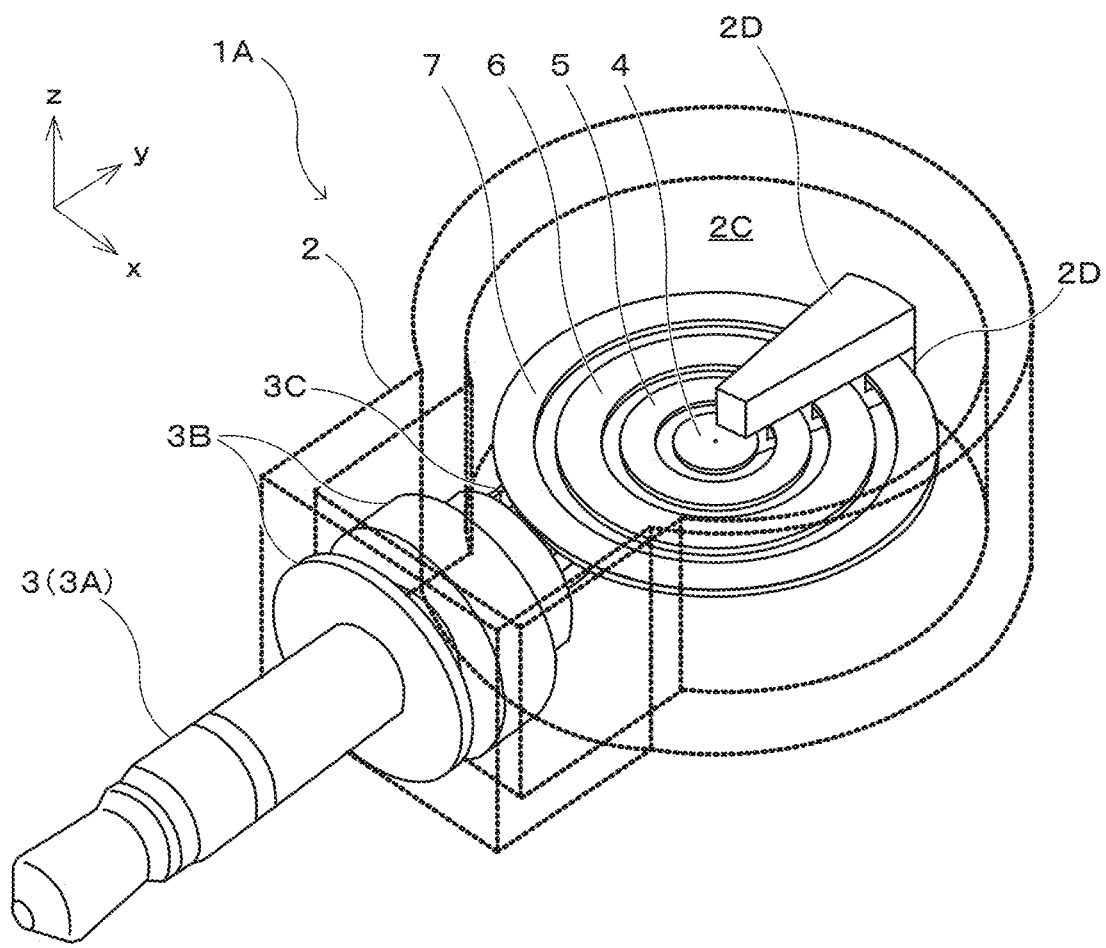
FIG. 3 is a schematic perspective view of the internal configuration of the bone conduction earphone illustrated in FIG. 1.

With reference to FIG. 2, the casing 2 includes covers 2A and 2B and is configured by fitting the cover 2A with the cover 2B. The casing 2 has a shape composed of a cylindrical segment and a rectangular parallelepiped segment bonded to a lateral surface of the cylindrical segment. With reference to FIG. 3, the casing 2 has therein an internal space 2C having a shape substantially similar to the external shape. The signal input unit 3 has an engaging portion 3B. The engaging portion 3B engages the casing 2 while being held between the lateral walls of the covers 2A and 2B that constitute the end of the rectangular parallelepiped segment. The signal input unit 3 is thus fixed to the casing 2.

The signal input unit 3 has an audio input terminal (earphone plug) 3A protruding from the casing 2. The signal input unit 3 further has an output electrode 3C at the end opposite to the audio input terminal 3A in the internal space 2C. The audio input terminal 3A is electrically conductive to the output electrode 3C. The audio voltage signal is input from the earphone jack 101 to the audio input terminal 3A and is then transmitted to the output electrode 3C.

The bone conduction earphone 1A is equipped with a plurality of diaphragms 4, 5, 6, and 7 that oscillate in accordance with the audio voltage signal output from the output electrode 3C. The diaphragms 4, 5, 6, and 7 are accommodated in the internal space 2C. The internal space 2C has a sufficient capacity and thus does not block the oscillations of the diaphragms 4, 5, 6, and 7. The signal input unit 3 is disposed so as not to come into contact with the diaphragms 4, 5, 6, and 7.

Figure 4:
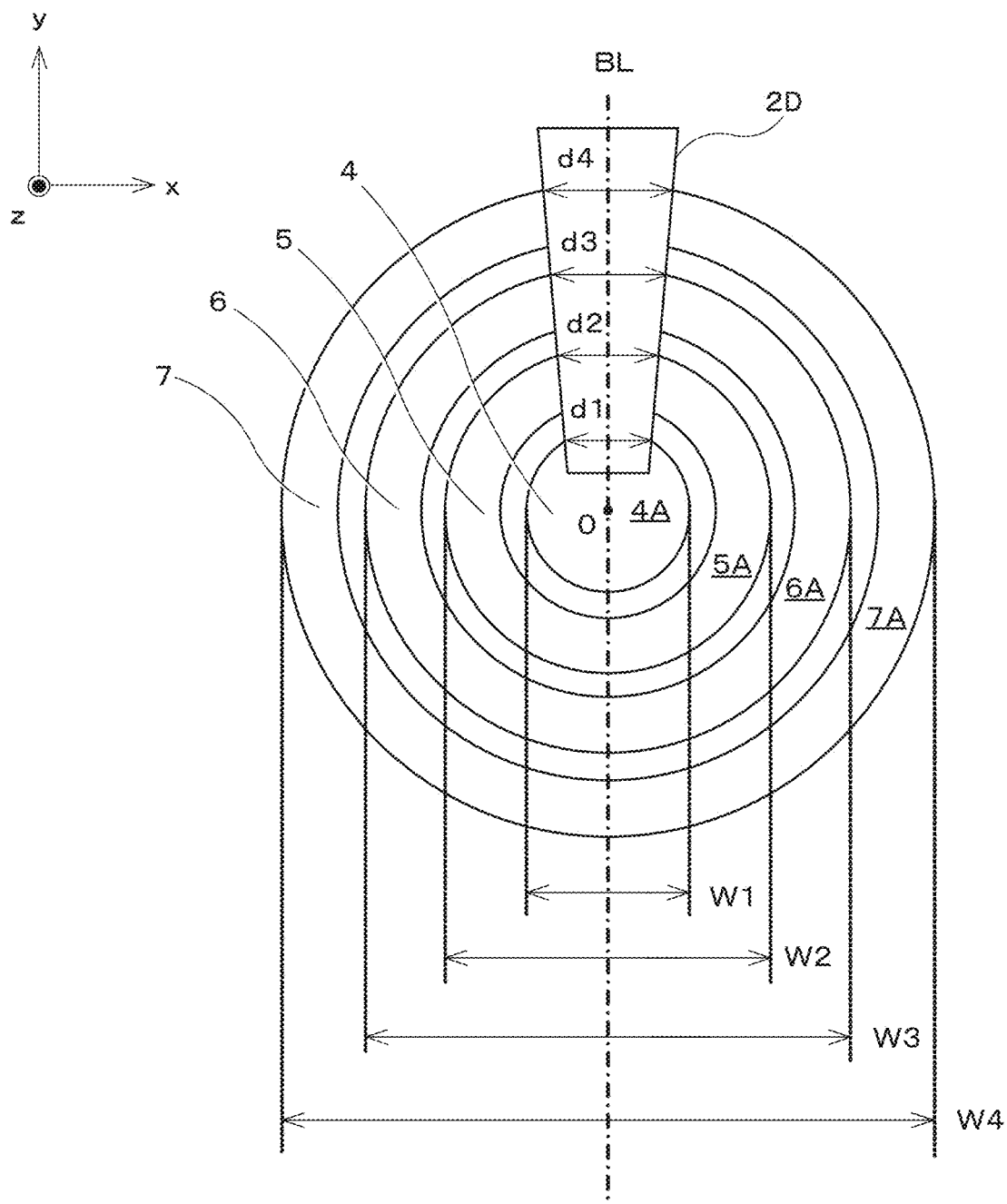
FIG. 4 is a top view of diaphragms.
Figure 5:
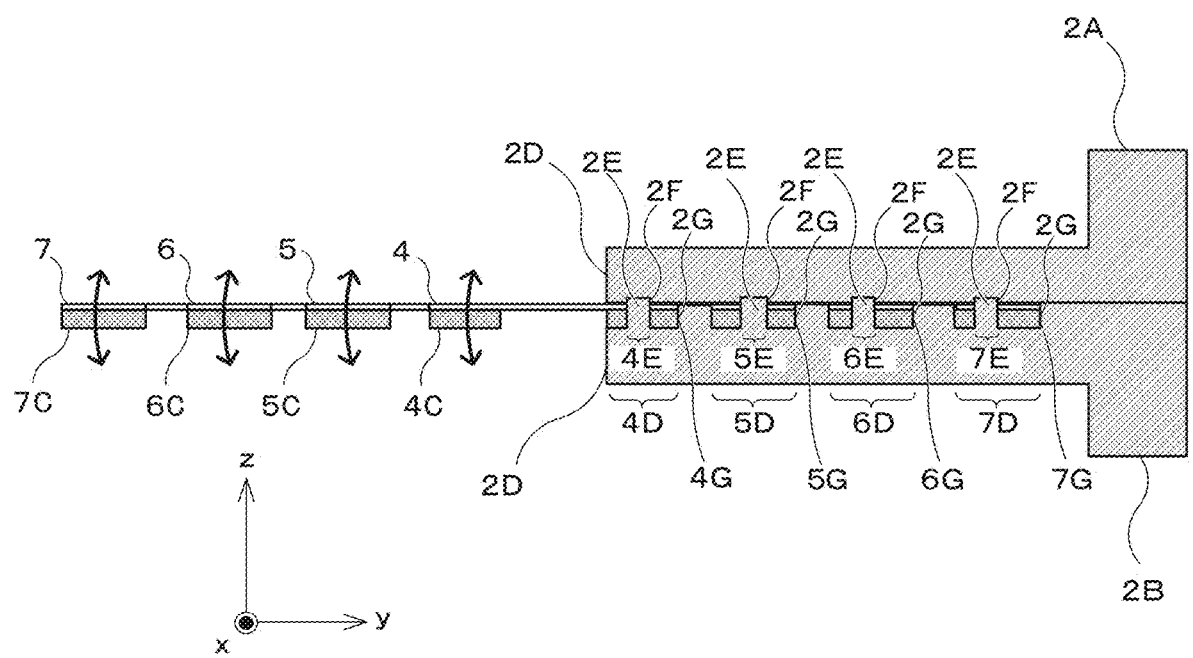
FIG. 5 is a sectional view of the diaphragms taken along the reference line BL illustrated in FIG. 4.

With reference to FIGS. 3 and 4, the casing 2 has fixing parts 2D for fixing a portion of each of the diaphragms 4, 5, 6, and 7. With reference to FIG. 5, which is a sectional view taken along the reference line BL illustrated in FIG. 4, the respective fixing parts 2D are provided to the covers 2A and 2B. That is, the pair of fixing parts 2D hold the diaphragms 4, 5, 6, and 7 therebetween in the z-axis direction to retain the diaphragms 4, 5, 6, and 7 in a cantilever manner. The diaphragms 4, 5, 6, and 7 have fixed portions 4D, 5D, 6D, and 7D, respectively, that are fixed by being held between the fixing parts 2D. Each of the fixed portions 4D, 5D, 6D, and 7D has a thickness larger than the thickness of the other portion, that is, the oscillating portion that protrudes from the fixed portion.

Figure 6:
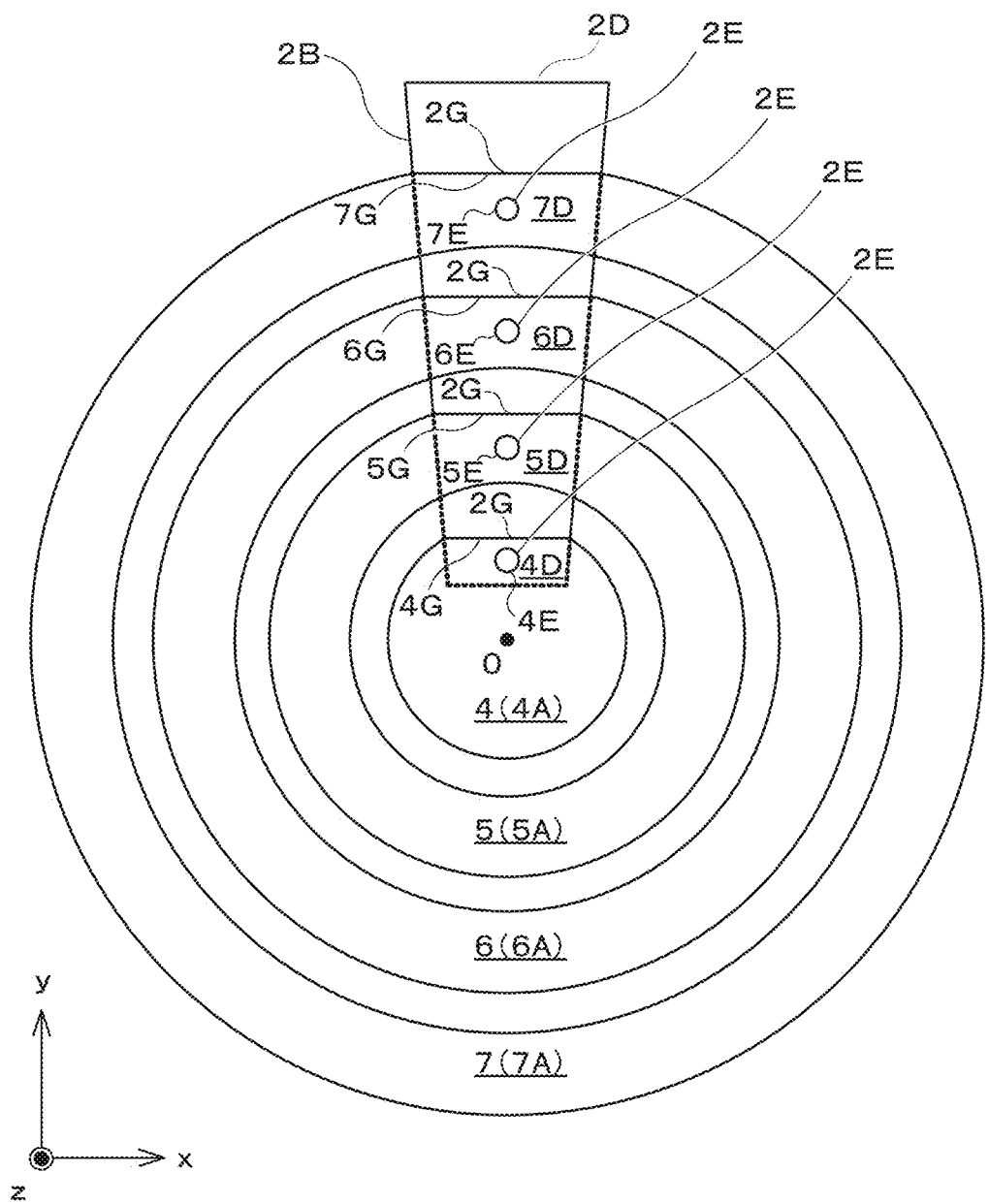
FIG. 6 illustrates a structure for fixing the diaphragms.

With reference to FIG. 5 and FIG. 6, which is a top view without the cover 2A, the fixed portions 4D, 5D, 6D, and 7D further have through holes 4E, 5E, 6E, and 7E, respectively, extending through the fixed portions 4D, 5D, 6D, and 7D in the z-axis direction. The fixing part 2D of the cover 2B has four upright bosses 2E that are cylindrical protrusions. The bosses 2E are inserted into the respective through holes 4E, 5E, 6E, and 7E of the diaphragms 4, 5, 6, and 7. The fixing part 2D of the cover 2A has four cylindrical recesses 2F. The tops of the bosses 2E are inserted through the through holes 4E, 5E, 6E, and 7E into the respective recesses 2F. The bosses 2E disposed in the through holes 4E, 5E, 6E, and 7E can restrict horizontal movement of the diaphragms 4, 5, 6, and 7 within the casing 2 in the xy plane. This configuration can more firmly fix the diaphragms 4, 5, 6, and 7 at a desired position of the casing 2.

The fixed portions 4D, 5D, 6D, and 7D are provided with straight cut-out edges 4G, 5G, 6G, and 7G, respectively, at the +y ends. The cover 2B has four side walls 2G extending in the x-axis direction. The respective side walls 2G come into contact with the cut-out edges 4G, 5G, 6G, and 7G of the diaphragms 4, 5, 6, and 7. This configuration can restrict rotation of the diaphragms 4, 5, 6, and 7 around the bosses 2E in the xy plane within the casing 2.

The diaphragms 4, 5, 6, and 7 have flexibility. The portions of the diaphragms 4, 5, 6, and 7 that are not fixed by the fixing parts 2D are warped and oscillate in accordance with the audio voltage signal output from the output electrode 3C. If the diaphragms 4, 5, 6, and 7 repeat deformation to oscillate, the free ends of the diaphragms 4, 5, 6, and 7 on the −y side swing up and down about the fixed ends formed by the fixing parts 2D (fixed portions 4D, 5D, 6D, and 7D), as illustrated in FIG. 5.

The diaphragms 4, 5, 6, and 7 have mutually different shapes and thus have mutually different resonance frequencies. The casing 2 transmits oscillations transmitted from the diaphragms 4, 5, 6, and 7 to the outside via the fixing parts 2D. The mutually different resonance frequencies of the diaphragms 4, 5, 6, and 7 can broaden the frequency band in which the oscillations from the diaphragms 4, 5, 6, and 7 have a large amplitude.

The diaphragms 4, 5, 6, and 7 will be described in more detail. As illustrated in FIG. 4, the respective surfaces of the diaphragms 4, 5, 6, and 7 that are parallel to the xy plane and that faces the +z side are hereinafter referred to as "main surfaces 4A, 5A, 6A, and 7A". The diaphragms 4, 5, 6, and 7 have the main surfaces 4A, 5A, 6A, and 7A having mutually different areas and thus have mutually different resonance frequencies, from another point of view. The diaphragm 4 is a disk-shaped member parallel to the xy plane and each of the diaphragms 5, 6, and 7 is an annular member parallel to the xy plane. The diaphragms 4, 5, 6, and 7 are arranged in the same plane parallel to the xy plane. Each of the main surfaces 5A, 6A, and 7A of the diaphragms 5, 6, and 7 has an opening at the center, which surrounds another diaphragm (for example, the diaphragm 4). The diaphragms 4, 5, 6, and 7 are concentrically arranged around the point O.

As described above, central portions of the main surfaces 5A, 6A, and 7A of the diaphragms 5, 6, and 7 are cut out and define openings. This structure can further lower the resonance frequencies of the diaphragms 5, 6, and 7. Since the cut out portions (openings) of the main surfaces 5A, 6A, and 7A surround other diaphragms and the diaphragms 4, 5, 6, and 7 are arranged in the same plane, the thickness of the casing 2 can be reduced. In addition, the concentric arrangement of the diaphragms 4, 5, 6, and 7 can contribute to balanced oscillations of the diaphragms 4, 5, 6, and 7.

As illustrated in FIG. 4, the main surfaces 4A, 5A, 6A, and 7A of the diaphragms 4, 5, 6, and 7 have widths W1, W2, W3, and W4, respectively, which are longer than widths d1, d2, d3, and d4 of the fixing parts 2D (that is, the dimensions of the ends of the diaphragms 4, 5, 6, and 7 that are fixed by the fixing parts 2D) with respect to the direction (x-axis direction) orthogonal to the direction that extends from the fixing parts 2D to the center O of the diaphragms 4, 5, 6, and 7. This configuration can increase the electromechanical coupling coefficient, which indicates the ratio of the oscillatory displacement (mechanical energy) of the casing 2 to the electromagnetic energy applied to the diaphragms 4, 5, 6, and 7.

Figure 7:
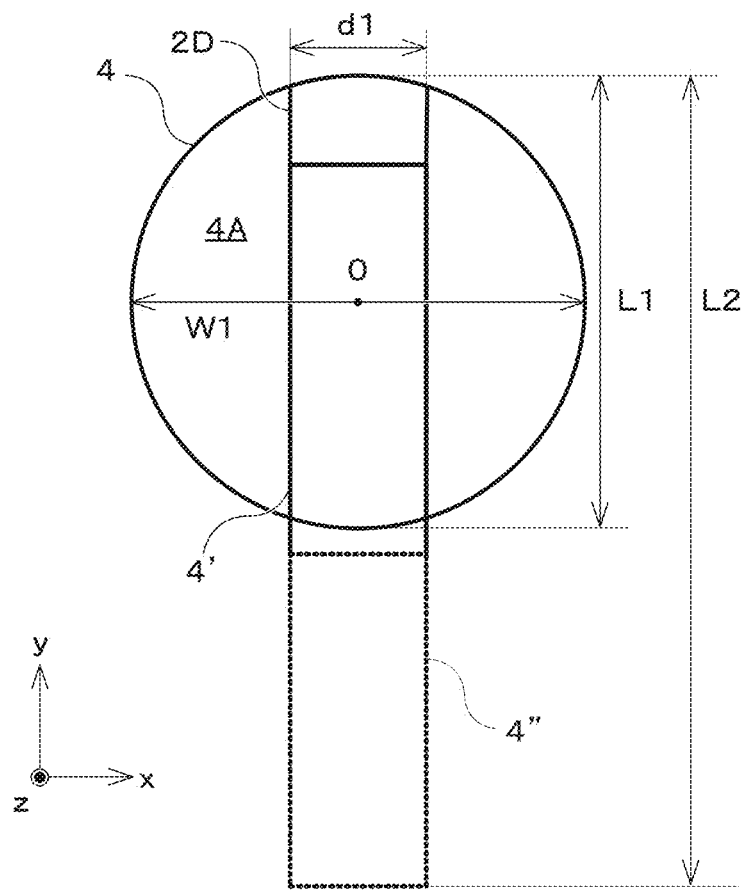
FIG. 7 illustrates a result of comparison between the diaphragm illustrated in FIG. 3 and a cantilever diaphragm.

For example, with reference to FIG. 7, in comparison to a cantilever diaphragm 4', which has the same width as the width d1 of the fixing parts 2D and which has the same length L1 as the length of the diaphragm 4 according to the embodiment, the diaphragm 4 has a higher electromechanical coupling coefficient, resulting in a larger oscillatory displacement of the casing 2. As the oscillatory displacement of the casing 2 increases, the user can more readily hear the sound.

A cantilever diaphragm having the same width as the width d1 of the fixing parts 2D needs to have a length L2 longer than the length L1, like a diaphragm 4" illustrated in FIG. 7, for example, so as to achieve the same electromechanical coupling coefficient as that of the diaphragm 4. The ratio of the length to the width is thus excessively high, leading to a poor balance between the length and the width (which may cause undesirable sound transmission). In contrast, in the case of the diaphragm 4 according to the embodiment, the displacement of the casing 2 can be increased while ensuring the low ratio of the length to the width (that is, maintaining the balance between the length and the width), thereby achieving desirable sound transmission. The same holds true for the diaphragms 5, 6, and 7.

The main surfaces 4A, 5A, 6A, and 7A of the diaphragms 4, 5, 6, and 7 are symmetrical about the reference line BL that extends from the bosses 2E (fixing parts 2D) through the center O of the diaphragms 4, 5, 6, and 7 and that is parallel to the y-axis, for example, as illustrated in FIG. 4. These shapes lead to balanced oscillations of the diaphragms 4, 5, 6, and 7 retained as cantilevers.

Each of the diaphragms 4, 5, 6, and 7 has a plurality of layers stacked on each other. Each of the layers of the diaphragms 4, 5, 6, and 7 is fabricated by the micro electro mechanical systems (MEMS) technology, which is semiconductor manufacturing technology. The diaphragms 4, 5, 6, and 7 are fabricated using a silicon-on-insulator (SOI) substrate. The SOI substrate has a layered structure including a support substrate composed of a semiconductor substrate, a BOX layer that is an embedded oxide film on the support substrate, and a silicon (SOI) layer that is a semiconductor layer on the BOX layer. That is, the SOI substrate is a wafer including an oxide film.

Figure 8A:
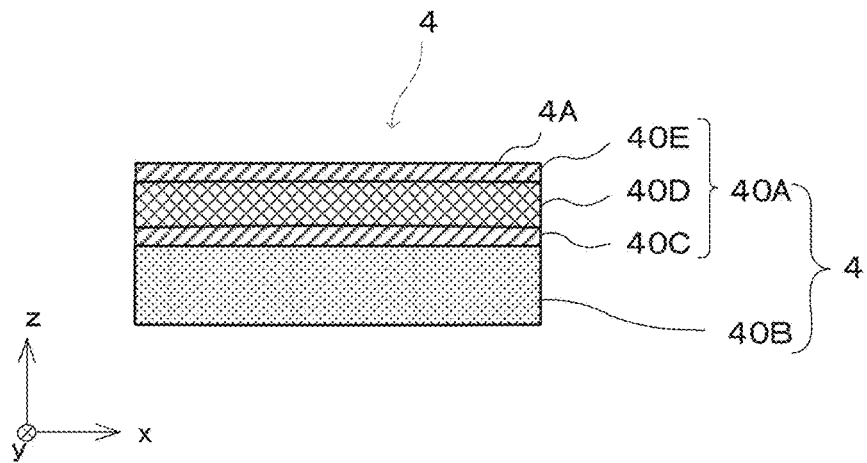
FIG. 8A is a sectional view of the layered structure of a diaphragm.

For example, with reference to the sectional view of the diaphragm 4 in FIG. 8A, a base material layer 40B, which is the undermost layer facing the −z side, is composed of a silicon layer on the BOX layer. A lower electrode sublayer 40C, a piezoelectric material sublayer 40D, and an upper electrode sublayer 40E are layered in the order mentioned on the base material layer 40B. The lower electrode sublayer 40C, the piezoelectric material sublayer 40D, and the upper electrode sublayer 40E constitute a piezoelectric layer 40A. That is, each of the diaphragms 4, 5, 6, and 7 has the base material layer (substrate) 40B and the piezoelectric layer 40A laminated on the base material layer 40B.

The lower electrode sublayer 40C and the upper electrode sublayer 40E are composed of an electrically conductive material (for example, a metal, such as aluminum or copper). The piezoelectric material sublayer 40D is composed of a material (material having piezoelectric properties), such as lead zirconate titanate (PZT). The piezoelectric material sublayer 40D expands and contracts in the longitudinal direction (direction orthogonal to the thickness direction) in response to application of voltage having a certain polarity in the thickness direction.

Figure 8B:
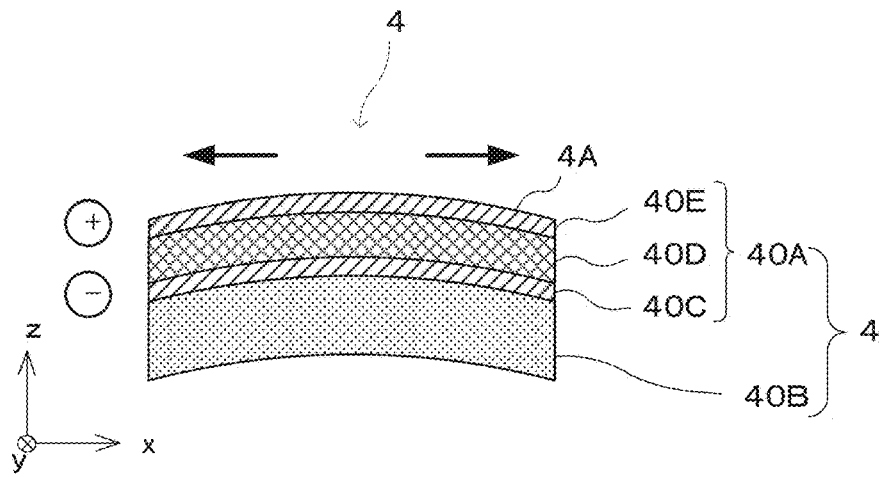
FIG. 8B is a sectional view of the diaphragm during application of voltage having a positive polarity to a piezoelectric layer.

With reference to FIG. 8B, when applying voltage having a polarity (hereinafter referred to as "positive polarity") such that the upper electrode sublayer 40E is positive and the lower electrode sublayer 40C is negative, the piezoelectric layer 40A expands in the longitudinal direction, resulting in a stress in the direction of expansion along the surface (along the y-axis) on the main surface 4A. The diaphragm 4 is thus warped to be convex upward.

In contrast, with reference to FIG. 8C, when applying voltage having a polarity (hereinafter referred to as "negative polarity") such that the upper electrode sublayer 40E is negative and the lower electrode sublayer 40C is positive, the piezoelectric layer 40A contracts in the longitudinal direction, resulting in a stress in the direction of contraction along the surface on the main surface 4A. The diaphragm 4 is thus warped to be convex downward.

Alternatively, the piezoelectric material sublayer 40D may contract in the longitudinal direction in response to application of voltage between the electrodes such that the upper electrode sublayer 40E is positive and the lower electrode sublayer 40C is negative, and may expand in the longitudinal direction in response to application of voltage between the electrodes such that the upper electrode sublayer 40E is negative and the lower electrode sublayer 40C is positive. In this case, the diaphragm is warped to be convex downward in response to application of voltage having the positive polarity and is warped to be convex upward in response to application of voltage having the negative polarity. That is, the diaphragms 4, 5, 6, and 7 are only required to be warped and oscillate due to expansion and contraction of the piezoelectric layers 40A.

Figure 8C:
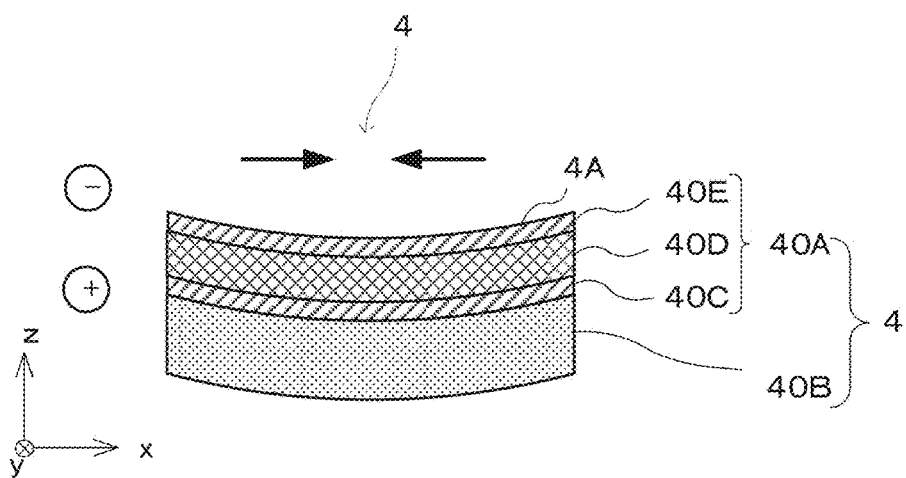
FIG. 8C is a sectional view of the diaphragm during application of voltage having a negative polarity to the piezoelectric layer.

In either case, application of voltage having a certain polarity between the upper electrode sublayer 40E and the lower electrode sublayer 40C can cause deformation illustrated in FIG. 8B or 8C. The level of deformation varies depending on the value of the applied voltage. It should be noted that the above-described relationship between the voltage polarity and the expansion or contraction may be reversed because the polarizing action varies depending on the material (for example, a bulk or thin film) of the piezoelectric element.

The output electrode 3C of the signal input unit 3 is connected to the lower electrode sublayer 40C and the upper electrode sublayer 40E with a lead wire (not shown). The audio voltage signal output from the earphone jack 101 of the smartphone 100 is applied via the signal input unit 3 to the piezoelectric layers 40A of the diaphragms 4, 5, 6, and 7. The piezoelectric layers 40A are driven in accordance with the audio voltage signal and thus cause the diaphragms 4, 5, 6, and 7 to oscillate, as illustrated by the arrows in FIG. 5. These oscillations are transmitted through the fixed portions 4D, 5D, 6D, and 7D and the fixing parts 2D to the casing 2 (covers 2A and 2B). The casing 2 can transmit the oscillations, which are transmitted from the diaphragms 4, 5, 6, and 7 through the fixing parts 2D, to the outside. The user h (refer to FIG. 1) can thus hear the sound generated by the oscillations.

The fixing parts 2D are disposed at the end of the internal space 2C opposite to the signal input unit 3. That is, the fixing parts 2D are disposed as distant from the signal input unit 3 as possible, which is inserted into the smartphone 100. As the reception positions of the oscillations from the diaphragms 4, 5, 6, and 7 become more distant from the signal input unit 3, which is connected to the smartphone 100, the oscillatory displacement of the casing 2 increases.

The diaphragms 4, 5, 6, and 7 are further provided with weights 4C, 5C, 6C, and 7C, respectively, at the ends opposite to the fixing parts 2D. These weights 4C, 5C, 6C, and 7C are installed to adjust the resonance frequencies of the diaphragms 4, 5, 6, and 7 to low frequencies.

Figure 9:
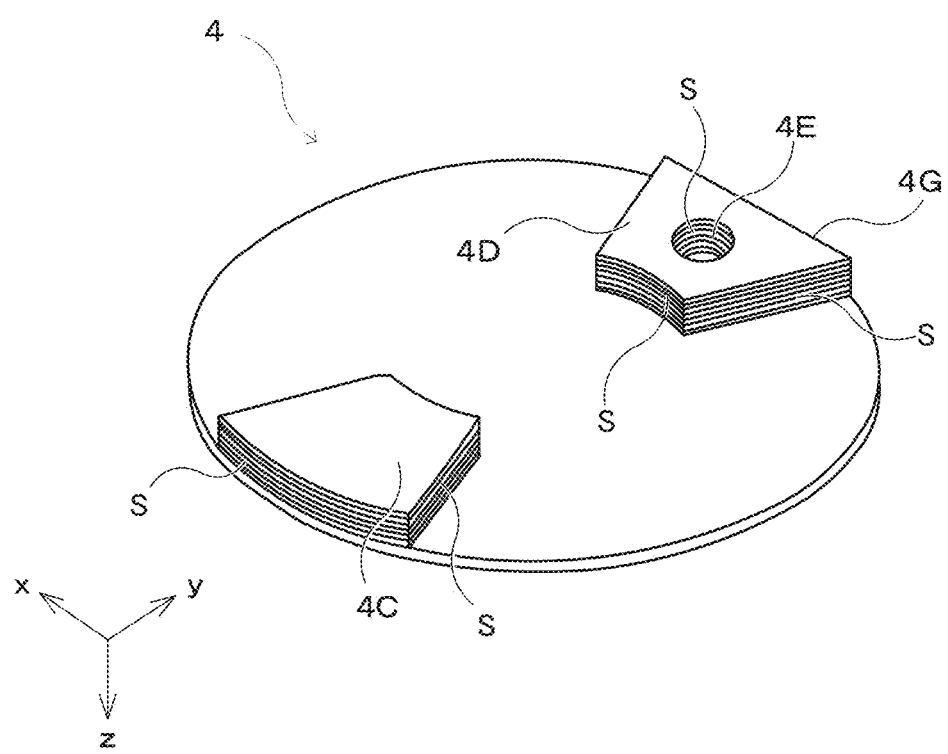
FIG. 9 illustrates exemplary scallops.

The fixed portions 4D, 5D, 6D, and 7D and the weights 4C, 5C, 6C, and 7C further have a support substrate layer remaining under the base material layer 40B and the piezoelectric layer 40A that are layered on each other. The fixed portions 4D, 5D, 6D, and 7D and the weights 4C, 5C, 6C, and 7C are formed by deep etching on the silicon layer of the SOI substrate. The side walls of the fixed portions 4D, 5D, 6D, and 7D and the weights 4C, 5C, 6C, and 7C are provided with scallops S (for example, refer to FIG. 9) defined by corrugations repeated in the thickness direction. The scallops S are corrugations in the depth (thickness) direction that are formed by repeated etching steps in the deep etching. The number of scallops S depends on the number of repeated etching steps, which will be described later. The deep etching is also called the Bosch process. The Bosch process involves repetition of steps of isotropic etching, protective film formation (passivation), and anisotropic etching.

When the smartphone 100 receives an incoming call, the user h inserts the audio input terminal 3A of the bone conduction earphone 1A into the earphone jack 101 and then manipulates the smartphone 100 while keeping the casing 2 in contact with the skin of the head, as illustrated in FIG. 1. This simple operation can start a phone call. The user h can also make a phone call with the smartphone 100 by the same operation. In addition to phone calls, the bone conduction earphone 1A can also be used in listening music or other recorded audio data.

As described in detail above, the diaphragms 4, 5, 6, and 7 have mutually different resonance frequencies in the embodiment. This configuration can broaden the frequency band of the audio voltage signal for causing oscillations of the diaphragms 4, 5, 6, and 7 that can provide large oscillations of the casing 2, thereby ensuring the sufficient amplitude of oscillations corresponding to sound.

In the embodiment, the circular diaphragm 4 and the annular diaphragms 5, 6, and 7 are arranged in the same plane, so as to reduce the size of the bone conduction earphone 1A. For example, the casing 2 of the bone conduction earphone 1A may have a size of approximately 40 mm (length)×20 mm (width)×10 mm (thickness).

The bone conduction earphone 1A according to the embodiment is not required to be inserted into the external auditory canal. The user h can thus readily hear the environmental sound. This feature enables the user h to avoid dangerous situations and reduces the stress on the user h resulting from no input of the environmental sound.

Although the main surface 4A of the diaphragm 4 has a circular profile in the embodiment, this configuration should not be construed as limiting the disclosure. For example, the main surface 4A may have a polygonal profile, such as a square profile. For example, the main surface 4A may have a trapezoidal or rhombic profile. The length in the x-axis direction and the length in the y-axis direction may have any ratio. In accordance with this shape, the diaphragms 5, 6, and 7 may have a polygonal ring shape.

One of the important parameters of the bone conduction earphone 1A for transmitting high-quality sound to the user h is the resonance frequencies of the diaphragm 4. The resonance frequencies of the diaphragm 4, 5, 6, and 7 should preferably be in the range of 400 to 1000 Hz. The resonance frequencies of the diaphragms 4, 5, 6, and 7 should preferably be distributed (more preferably, evenly distributed) within this range. If the resonance frequencies of the diaphragms 4, 5, 6, and 7 are higher than the preferable range, the thicknesses of the diaphragms 4, 5, 6, and 7 should be reduced. In contrast, if the resonance frequencies of the diaphragms 4, 5, 6, and 7 are lower than the preferable range, the thicknesses of the diaphragms 4, 5, 6, and 7 should be increased. The above-described cantilever diaphragm 4' or 4" tends to have excessively low resonance frequencies. In contrast, the diaphragms 4, 5, 6, and 7 according to the embodiment tends to have resonance frequencies within the preferable range.

Figure 10A:
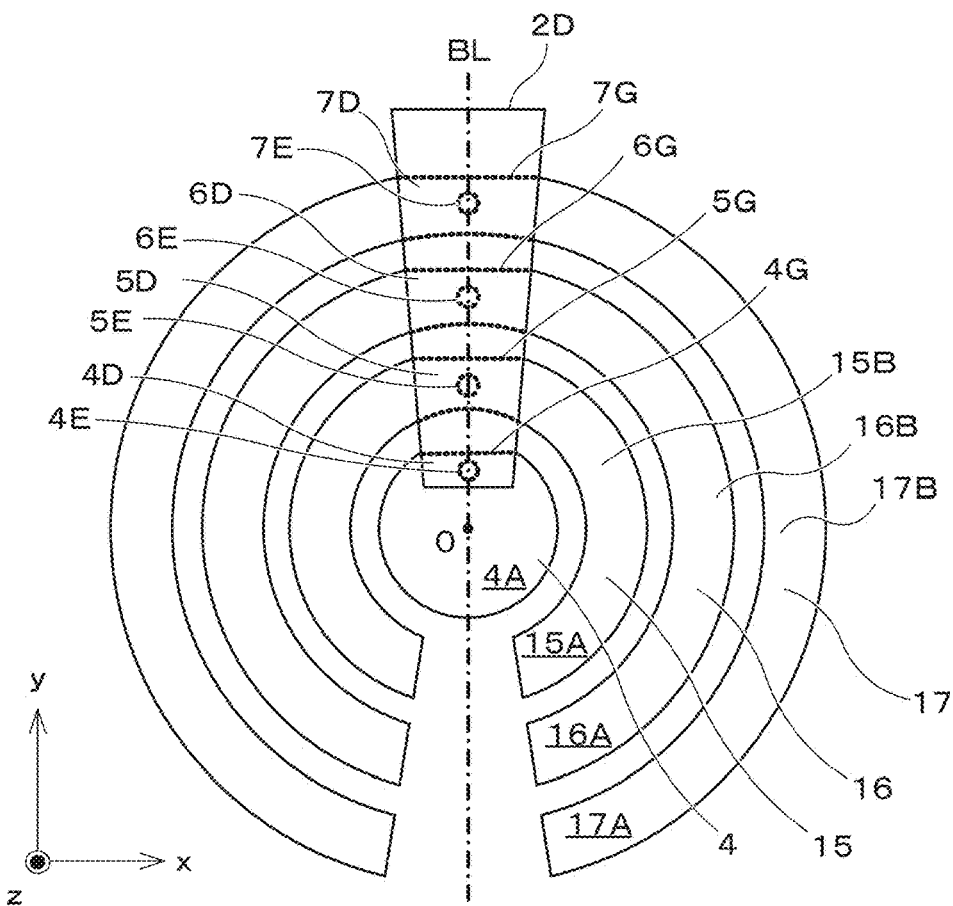
FIG. 10A is a top view of diaphragms according to a first modification.
Figure 10B:
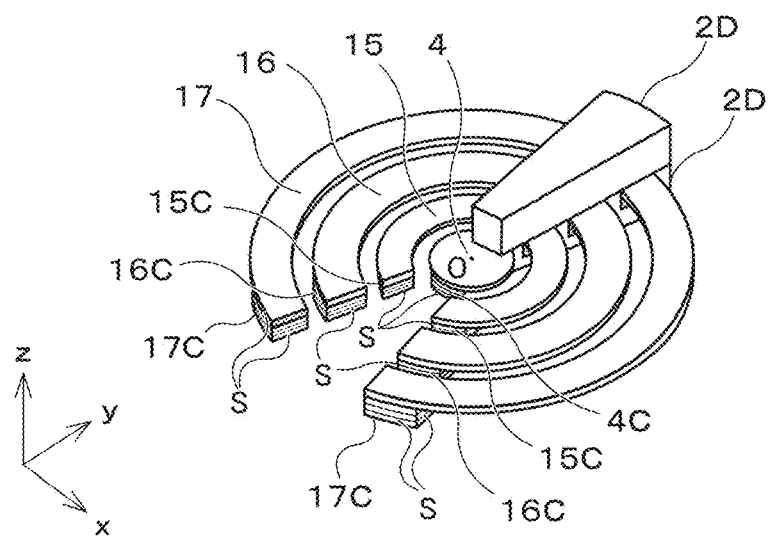
FIG. 10B is a perspective view of the diaphragms according to the first modification.

The annular diaphragms 5, 6, and 7 may be replaced with the diaphragms 15, 16, and 17 illustrated in FIGS. 10A and 10B. The diaphragms 15, 16, and 17 have main surfaces 15A, 16A, and 17A having central openings, like the diaphragms 5, 6, and 7. This structure can lower the resonance frequencies of the diaphragms 15, 16, and 17.

The diaphragms 15, 16, and 17 differ from the diaphragms 5, 6, and 7 only in that portions of the diaphragms 15, 16, and 17 that face the signal input unit 3 are cut out. These cut-out portions can accommodate the output electrode 3C of the signal input unit 3, the wiring between the output electrode 3C and the piezoelectric layers 40A, and other components. This configuration can further reduce the entire size of the earphone.

The diaphragms 15, 16, and 17 have arm portions 15B, 16B, and 17B, respectively, extending from the fixed portions 5D, 6D, and 7D toward both sides of the x-axis direction to define an arc shape and reaching the vicinity of the signal input unit 3. The arm portions 15B, 16B, and 17B are provided with weights 15C, 16C, and 17C, respectively, at the ends. The weights 15C, 16C, and 17C are installed to adjust the resonance frequencies of the diaphragms 15, 16, and 17 to low frequencies.

Figure 11A:
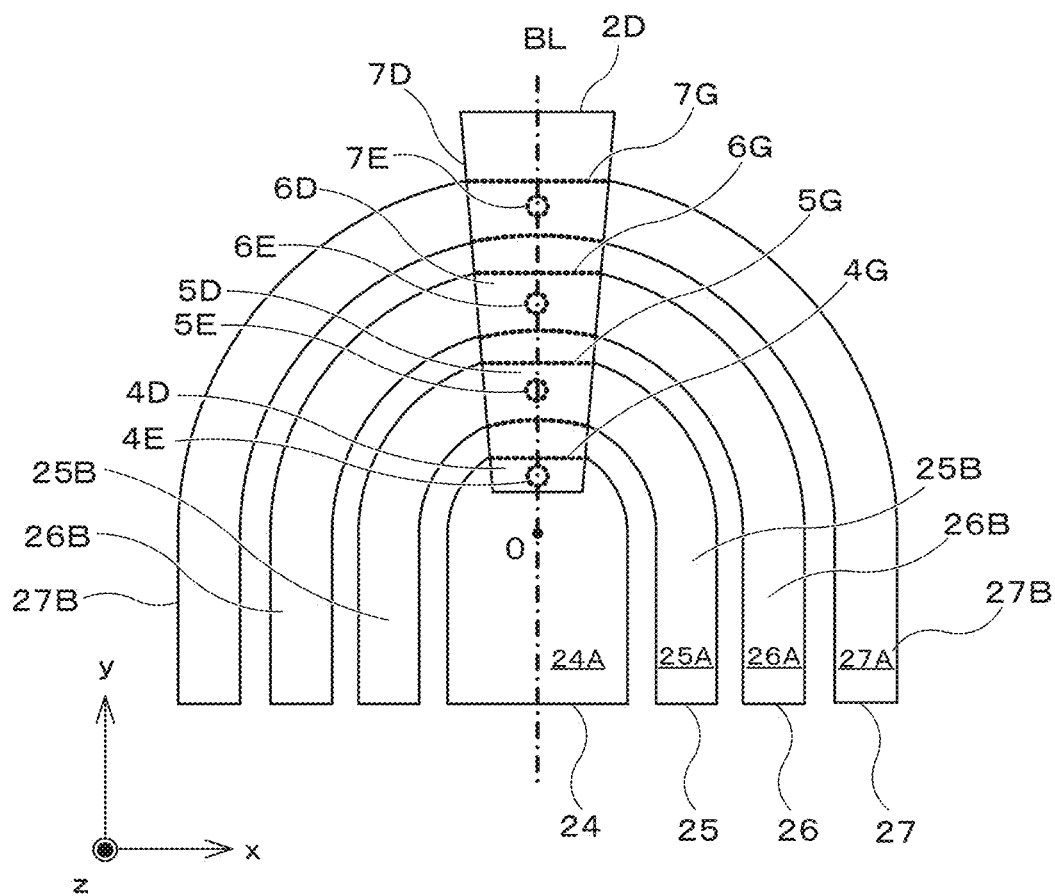
FIG. 11A is a top view of diaphragms according to a second modification.
Figure 11B:
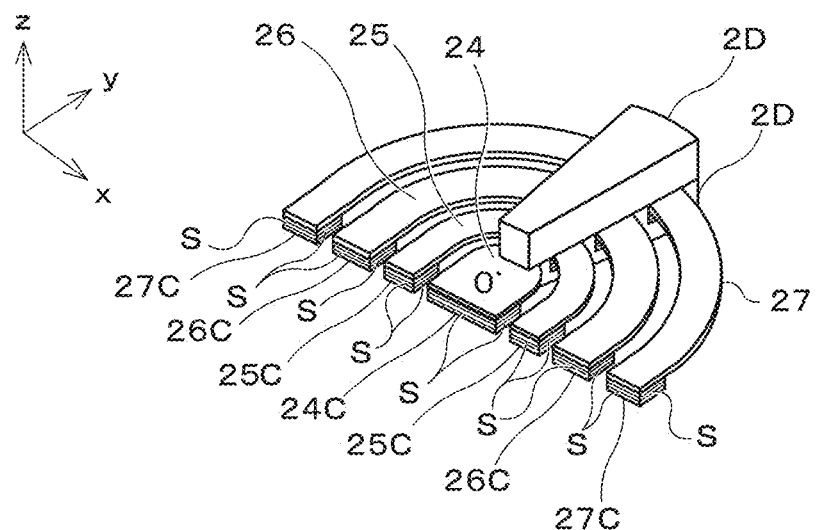
FIG. 11B is a perspective view of the diaphragms according to the second modification.

The diaphragms 4, 15, 16, and 17 may be replaced with diaphragms 24, 25, 26, and 27 illustrated in FIGS. 11A and 11B. The diaphragms 24, 25, 26, and 27 differ from the diaphragms 4, 5, 6, and 7 in that the diaphragm 24 has a substantially rectangular main surface 24A of which the long sides extend along the reference line BL and that the diaphragms 25, 26, and 27 have U-shaped main surfaces 25A, 26A, and 27A. The diaphragm 24 is disposed in the opening of the diaphragm 25, the diaphragms 24 and 25 are disposed in the opening of the diaphragm 26, and the diaphragms 24, 25, and 26 are disposed in the opening of the diaphragm 27.

Pairs of arm portions 25B, 26B, and 27B extend from the fixed portions 5D, 6D, and 7D, respectively. Each of the arm portions 25B, 26B, and 27B is composed of an arc section adjoining the fixed portion 5D, 6D, or 7D and a straight section extending in the −y direction. The end of the diaphragm 24 opposite to the fixing parts 2D and the ends of the arm portions 25B, 26B, and 27B are provided with weights 24C, 25C, 26C, and 27C, respectively. These weights 24C, 25C, 26C, and 27C are installed to adjust the resonance frequencies of the diaphragms 24, 25, 26, and 27. The diaphragms 24, 25, 26, and 27 oscillate in response to application of the audio voltage signal. These oscillations are transmitted through the fixed portions 4D, 5D, 6D, and 7D and the fixing parts 2D to the casing 2.

The diaphragms do not necessarily have C-shaped or U-shaped main surfaces. The main surfaces are only required to have an opening at the center and have a recessed shape defined by a cut-out portion that faces the signal input unit 3.

The number of diaphragms in the bone conduction earphone 1A is four, but may be two, three, or five or more.

Embodiment 2

Then, Embodiment 2 of the disclosure will now be described.

Figure 12:
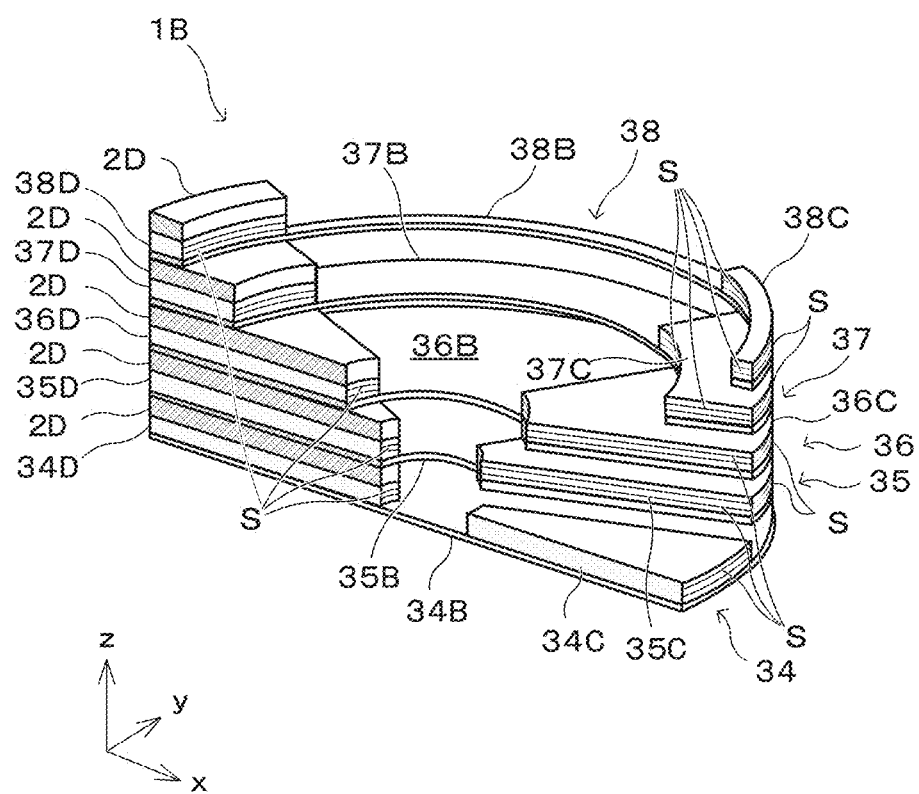
FIG. 12 is a perspective view of the internal configuration of a bone conduction earphone according to Embodiment 2 of the disclosure.

A bone conduction earphone according to the embodiment differs from the bone conduction earphone according to the above-described Embodiment 1 in the direction of arrangement of the diaphragms. With reference to FIG. 12, in the bone conduction earphone 1B according to the above-described Embodiment 2, diaphragms 34, 35, 36, 37, and 38 are arranged in their thickness direction. It should be noted that a casing that accommodates the diaphragms 34, 35, 36, 37, and 38 is not illustrated in FIG. 12.

Figure 13:
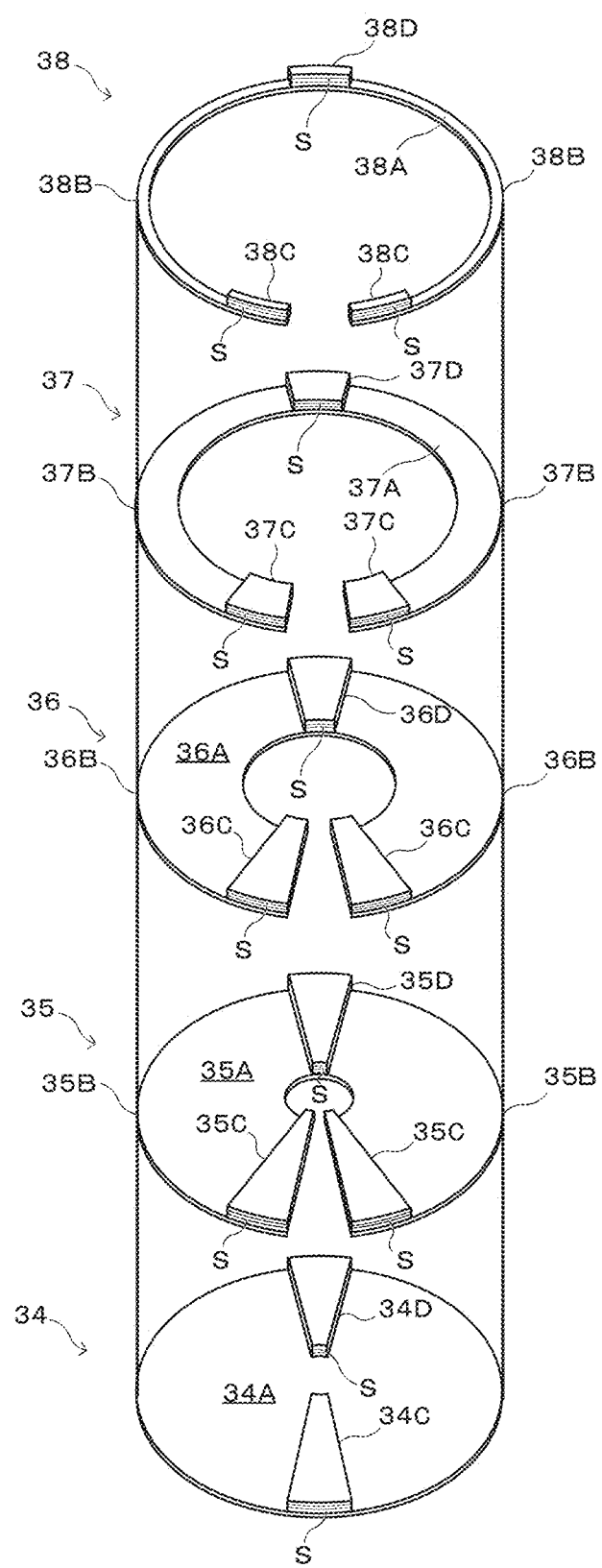
FIG. 13 illustrates the configuration of diaphragms.

With reference to FIG. 13, the diaphragms 34, 35, 36, 37, and 38 are disk-shaped or annular members having the same external dimension and have flexibility. The diaphragms 34, 35, 36, 37, and 38 have main surfaces 34A, 35A, 36A, 37A, and 38A, respectively. The main surface 34A of the diaphragm 34 has a circular profile. Each of the main surfaces 35A, 36A, 37A, and 38A of the diaphragms 35, 36, 37, and 38 has an annular shape with an opening at the center and is cut out in a portion of the annular shape.

In other words, portions of the outer peripheries of the diaphragms 34, 35, 36, 37, and 38 are provided with fixed portions 34D, 35D, 36D, 37D, and 38D, respectively, that are fixed to the casing. The diaphragms 35, 36, 37, and 38 have a pair of arm portions 35B, 36B, 37B, and 38B, respectively, extending from the fixed portions 35D, 36D, 37D, and 38D in arc shapes.

The diaphragms 34, 35, 36, 37, and 38 are further provided with weights 34C, 35C, 36C, 37C, and 38C, respectively, at the ends opposite to the fixed portions 34D, 35D, 36D, 37D, and 38D. These weights 34C, 35C, 36C, 37C, and 38C are installed to adjust the resonance frequencies of the diaphragms 34, 35, 36, 37, and 38 to low frequencies. The side walls of the fixed portions 34D, 35D, 36D, 37D, and 38D and the weights 34C, 35C, 36C, 37C, and 38C are provided with scallops S, as described above.

The diaphragms 34, 35, 36, 37, and 38 are arranged in ascending or descending order of the areas of the main surfaces 34A, 35A, 36A, 37A, and 38A of the diaphragms 34, 35, 36, 37, and 38. The diaphragms 34, 35, 36, 37, and 38 are also arranged in ascending or descending order of the weights of the weights 34C, 35C, 36C, 37C, and 38C provided to the diaphragms 34, 35, 36, 37, and 38. The diaphragms 34, 35, 36, 37, and 38 are thus arranged in ascending or descending order of the resonance frequencies. This configuration can facilitate adjustment of the resonance frequencies.

Figure 14:
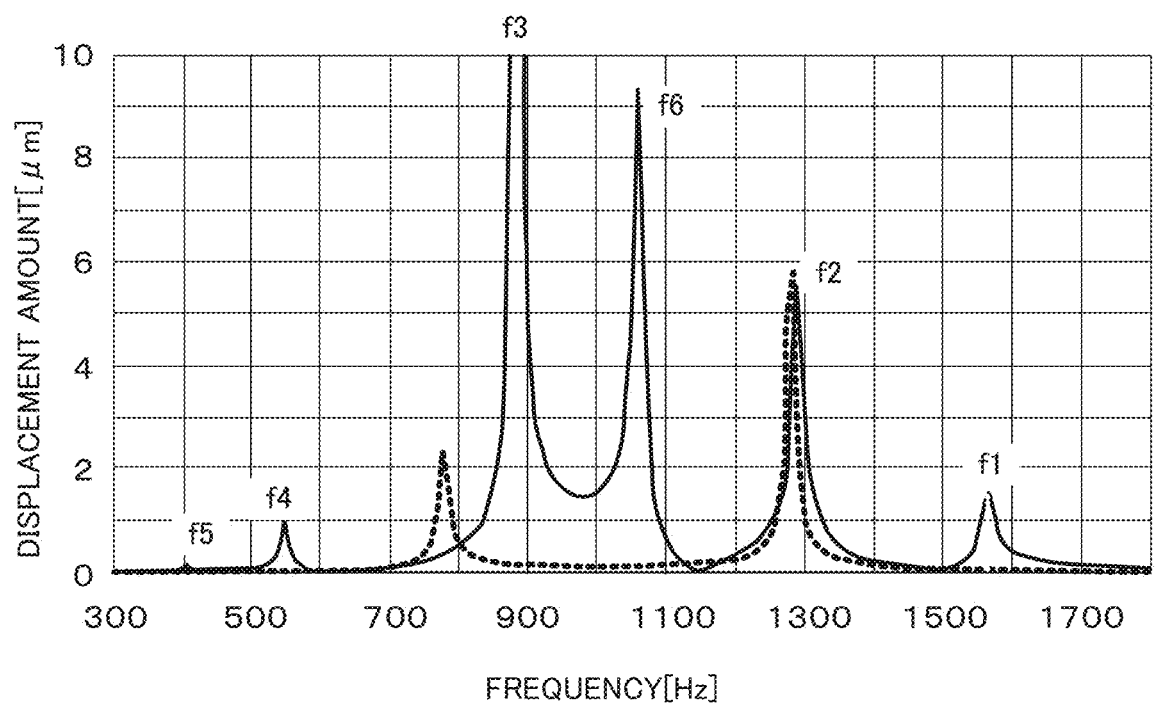
FIG. 14 is a graph illustrating the frequency characteristics of an oscillation displacement of a casing.

As described in detail above, the bone conduction earphone according to the embodiment includes the diaphragms 34, 35, 36, 37, and 38 having mutually different resonance frequencies. These diaphragms 34, 35, 36, 37, and 38 individually oscillate. The solid line in FIG. 14 represents the frequency characteristics of the oscillation amplitude (displacement amount) of the entire device, where f1, f2, f3, f4, and f5 indicate the resonance frequencies of the respective diaphragms 34, 35, 36, 37, and 38 and f6 indicates the resonance characteristics of the assembly including the casing and the device. In contrast, the dotted line represents the frequency characteristics of the oscillation amplitude of the entire bone conduction earphone including a single diaphragm 35 alone, for example. That is, the bone conduction earphone 1A can broaden the frequency band providing a large oscillation amplitude. For example, a single diaphragm can sufficiently transmit sound in the frequency band of 750 Hz or higher and 1300 Hz or lower, while the diaphragms 34 to 38 can sufficiently transmit sound in the broader frequency band of 550 Hz or higher and 1550 Hz or lower.

The diaphragms 35 to 38 may be replaced with diaphragms having an annular shape, U-shape, or a recessed shape.

Embodiment 3

Then, Embodiment 3 of the disclosure will now be described.

The bone conduction earphones 1A and 1B according to the above-described embodiments are used after the audio input terminal 3A of the signal input unit 3 is inserted directly into the earphone jack 101 of the smartphone 100. In contrast, with reference to FIG. 15, a bone conduction earphone 1C according to this embodiment can be used separately from the smartphone 100 using a cable, without direct insertion into the earphone jack 101 of the smartphone 100.

Figure 15:
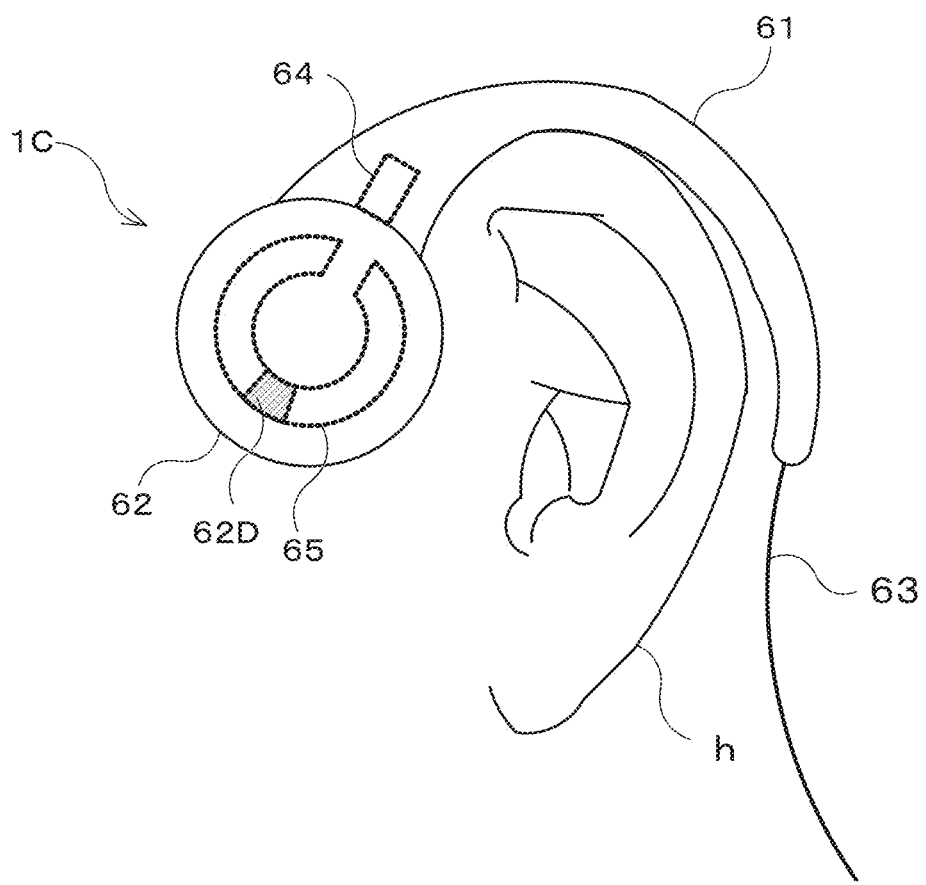
FIG. 15 is a perspective view of a bone conduction earphone according to Embodiment 3 of the disclosure.

The bone conduction earphone 1C according to the embodiment is installed around an ear of the user h, as illustrated in FIG. 15. The bone conduction earphone 1C includes a hook 61, a casing 62, a cord cable 63, and a signal input unit 64.

The hook 61 is hung on an ear of the user h such that the bone conduction earphone 1C is fixed while being adjacent to the cranial bone via the skin of the head of the user h. The casing 62 accommodates a diaphragm set 65 including a plurality of diaphragms having mutually different resonance frequencies in the internal space. The diaphragm set 65 is fixed to the casing 62 with a fixing part 62D. The cord cable 63 has an audio input terminal (earphone plug) at the end. The audio input terminal of the cord cable 63 is connected to the earphone jack 101 of the smartphone 100 (refer to FIG. 1).

The audio voltage signal output from the earphone jack 101 of the smartphone 100 is input into the signal input unit 64 via the cord cable 63. The signal input unit 64 applies this audio voltage signal to the diaphragm set 65 accommodated in the casing 62. The diaphragms of the diaphragm set 65 thus oscillate. The oscillations of the diaphragms are transmitted to the casing 62, thereby causing oscillations of the casing 62. These oscillations are transmitted to the user has acoustic oscillations.

In the bone conduction earphone 1C according to the embodiment, the diaphragms of the diaphragm set 65 may be the diaphragms 4 to 7, the diaphragms 4 and 15 to 17, or the diaphragms 24 to 27.

The bone conduction earphone 1C according to the embodiment can be installed around the ear all the time. The user thus can start talking immediately after an incoming call.

Embodiment 4

Then, Embodiment 4 of the disclosure will now be described.

The above description of Embodiments 1, 2, and 3 focuses on the bone conduction earphones 1A, 1B, and 1C that transmit oscillations of the diaphragms to the casing. The description of this embodiment focuses on a vibration power generator 1D that generates electric power based on oscillations of diaphragms.

Figure 16:
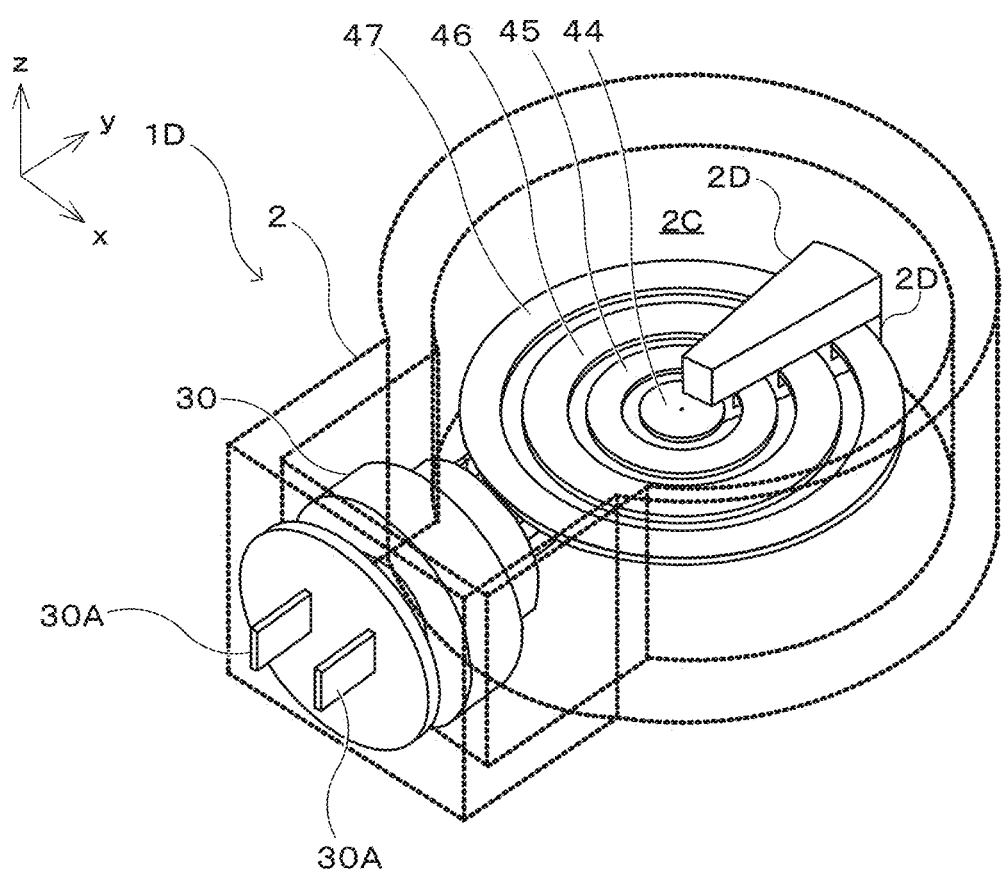
FIG. 16 is a perspective view of a vibration power generator according to Embodiment 4 of the disclosure.

With reference to FIG. 16, the vibration power generator 1D is equipped with diaphragms 44, 45, 46, and 47. The diaphragms 44, 45, 46, and 47 have the same shapes as those of the respective diaphragms 4, 5, 6, and 7 but have resonance frequencies of approximately several tens of hertz (50 Hz or lower). The diaphragms 44, 45, 46, and 47 oscillate in response to the oscillatory force received by the casing 2.

Figure 17:
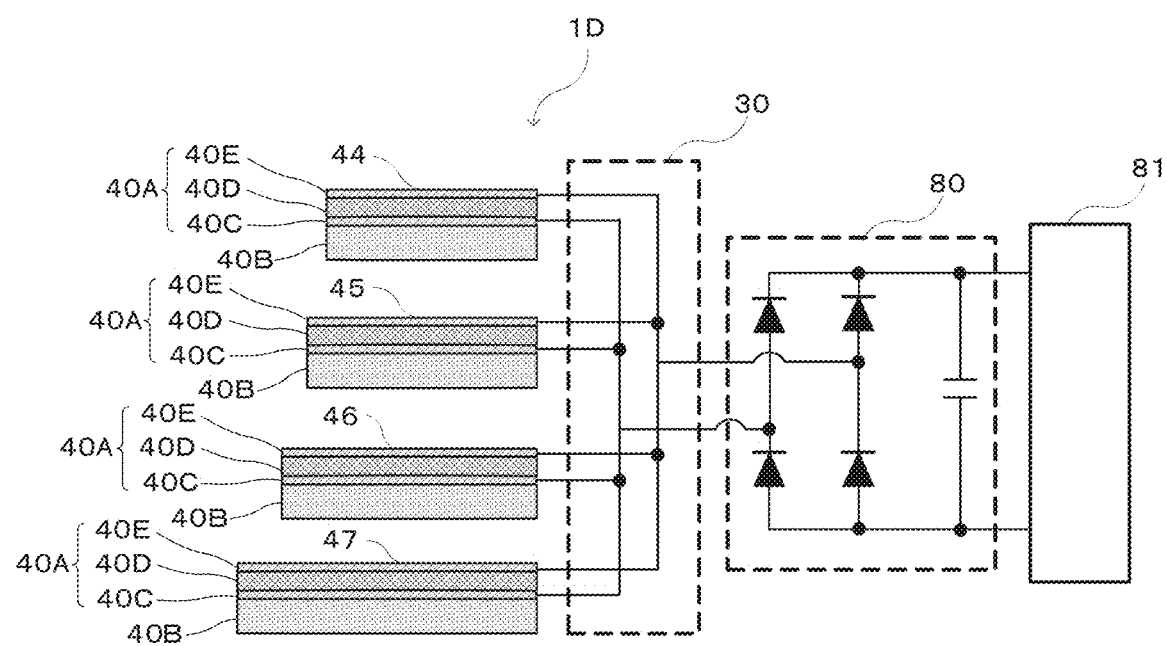
FIG. 17 is a schematic view illustrating a circuit configuration of the vibration power generator illustrated in FIG. 16.

The vibration power generator 1D differs from the bone conduction earphone 1A in including an output unit (input-output unit) 30 having a pair of terminals 30A in place of the signal input unit 3. The output unit 30 extracts, as current, electric charges generated by the above-mentioned oscillations in the piezoelectric layers 40A of the diaphragms 44, 45, 46, and 47. Each of the diaphragms 44, 45, 46, and 47 has a piezoelectric layer 40A and a base material layer 40B, as illustrated in FIG. 17.

The output unit 30 outputs current based on the electric charges output from the piezoelectric layers 40A of the diaphragms 44, 45, 46, and 47 via the pair of terminals 30A to a rectifying and smoothing circuit 80. The rectifying and smoothing circuit 80 rectifies and smooths the current extracted from the diaphragms 44, 45, 46, and 47 by using diodes and a capacitor included in the rectifying and smoothing circuit 80 and outputs the current to a rechargeable battery 81. The rechargeable battery 81 is charged based on the current rectified and smoothed by the rectifying and smoothing circuit 80.

In the vibration power generator 1D, when the casing 2 receives an oscillatory force from the outside, this force is transmitted through the fixing parts 2D to the diaphragms 44, 45, 46, and 47, so that the diaphragms 44, 45, 46, and 47 oscillate. If the frequency of the oscillatory force is close to any of the resonance frequencies of the diaphragms 44, 45, 46, and 47, the corresponding diaphragm provides large oscillations and generate high electric charges in the piezoelectric layer 40A included in the diaphragm.

The diaphragms 44, 45, 46, and 47 have mutually different resonance frequencies and can thus generate high electric charges in a relatively broad frequency band. That is, sufficient electric power can be generated in a broad frequency band.

As described above, preferable resonance frequencies of the diaphragms in the vibration power generator 1D according to the embodiment are lower than those in the bone conduction earphone 1A, in specific, several tens of hertz (50 Hz or lower).

The vibration power generator 1D may also be included in the smartphone 100. In this case, the smartphone 100 may include a plurality of rechargeable batteries, which are configured such that one of the rechargeable batteries is used while the others are charged by the vibration power generator 1D.

Embodiment 5

Then, Embodiment 5 of the disclosure will now be described.

Figure 18:
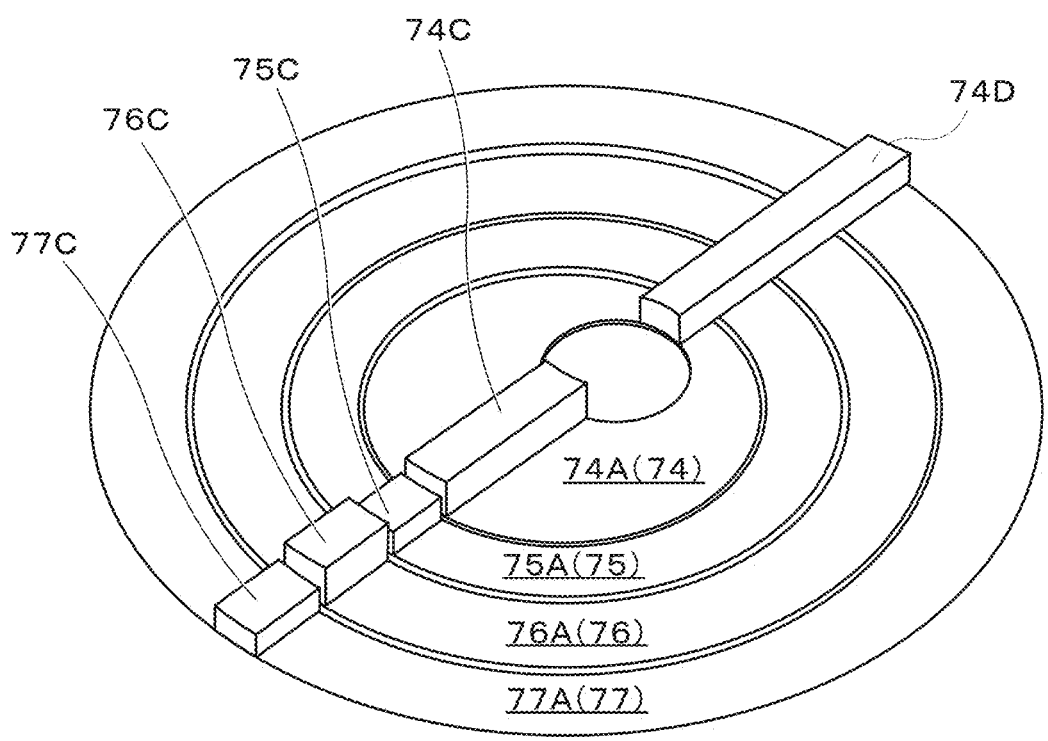
FIG. 18 is a perspective view of diaphragms of a vibration power generator according to Embodiment 5 of the disclosure.

The above description of Embodiment 4 focuses on the vibration power generator 1D that generates electric power based on oscillations of the diaphragms. With reference to FIG. 18, a vibration power generator according to Embodiment 5 differs from the vibration power generator 1D according to the above-described Embodiment 4 in including diaphragms 74, 75, 76, and 77 in place of the diaphragms 44, 45, 46, and 47. These diaphragms 74, 75, 76, and 77 are fixed at a fixed portion 74D.

The diaphragms 74, 75, 76, and 77 have main surfaces 74A, 75A, 76A, and 77A, respectively. Portions of the main surfaces 74A, 75A, 76A, and 77A are cut out and define openings. In the diaphragm 74, among the diaphragms 74, 75, 76, and 77, the cut-out portion (opening) is eccentrically disposed so as to be deviated from the center of the main surface 74A toward the fixed portion 74D.

Figure 19:
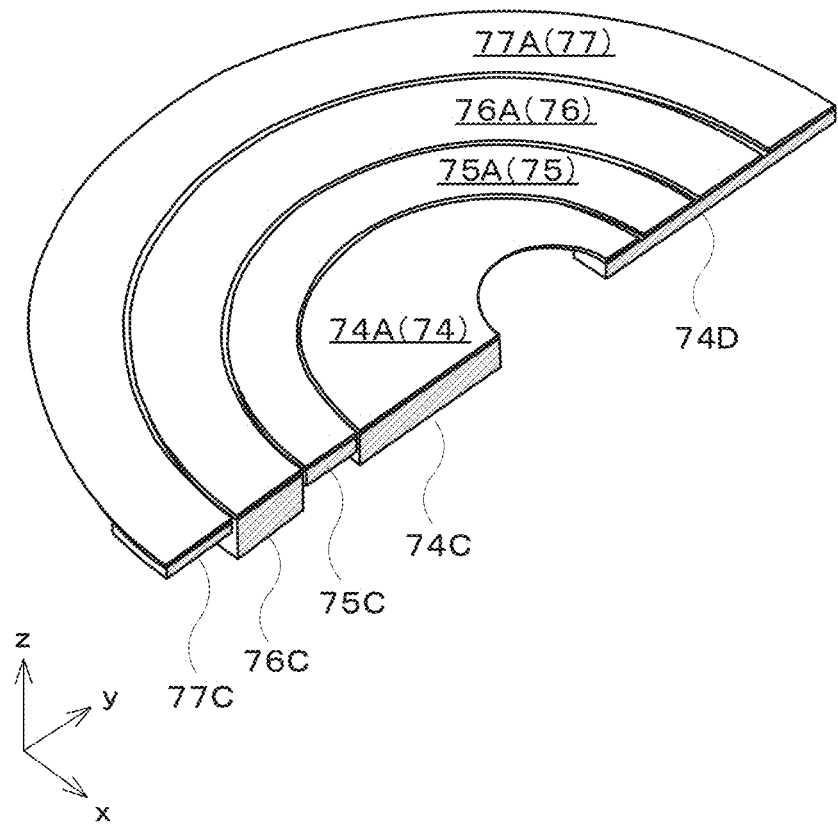
FIG. 19 is a sectional perspective view of the vibration power generator illustrated in FIG. 18.

With reference to FIG. 19, the diaphragms 74, 75, 76, and 77 are provided with weights 74C, 75C, 76C, and 77C, respectively, on the side of the centers of the main surfaces 74A, 75A, 76A, and 77A opposite to the fixed portion 74D. The weights 74C, 75C, 76C, and 77C have mutually different thicknesses and thus have mutually different weights. These weights 74C, 75C, 76C, and 77C are installed to finely adjust the resonance frequencies of the diaphragms 74, 75, 76, and 77 to desired frequencies.

Figure 20A:
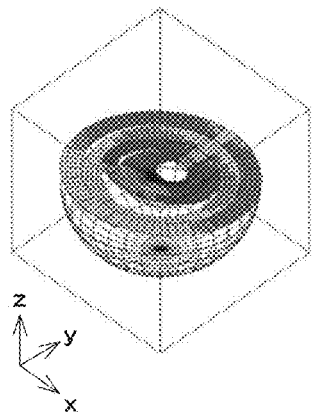
FIG. 20A illustrates a first voltage distribution generated on diaphragms when the diaphragms are inclined about the x-axis.
Figure 20B:
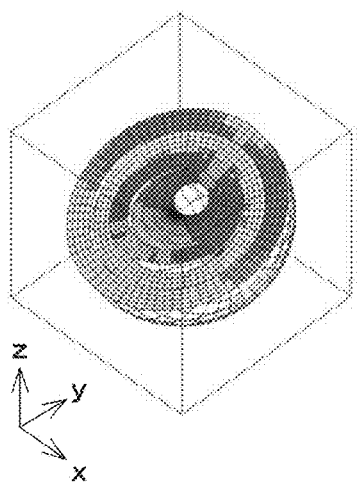
FIG. 20B illustrates a second voltage distribution generated on the diaphragms when the diaphragms are inclined about the x-axis.
Figure 20C:
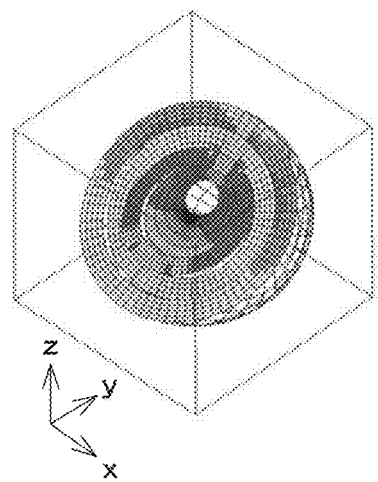
FIG. 20C illustrates a third voltage distribution generated on the diaphragms when the diaphragms are inclined about the x-axis.

In this embodiment, the entire width (the dimension in the x-axis direction) of each of the diaphragms 74 to 77 is longer than the entire width (the dimension in the x-axis direction) of the fixed portion 74D. Accordingly, even if the diaphragms 74 to 77 are inclined at 0°, 30°, and 45° about the x-axis and oscillate in the z-axis direction, the voltage distribution generated on the main surfaces 74A to 77A of the diaphragms 74 to 77 does not significantly vary, as illustrated in FIGS. 20A, 20B, and 20C. In FIGS. 20A, 20B, and 20C, a darker color represents a higher generated voltage.

Figure 21A:
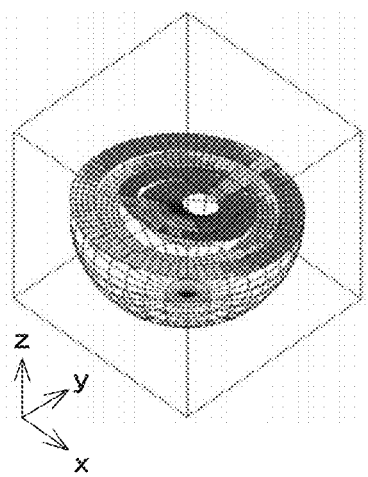
FIG. 21A illustrates a first voltage distribution generated on the diaphragms when the diaphragms are inclined about the y-axis.
Figure 21B:
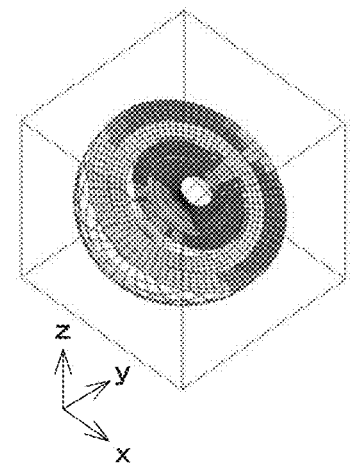
FIG. 21B illustrates a second voltage distribution generated on the diaphragms when the diaphragms are inclined about the y-axis.
Figure 21C:
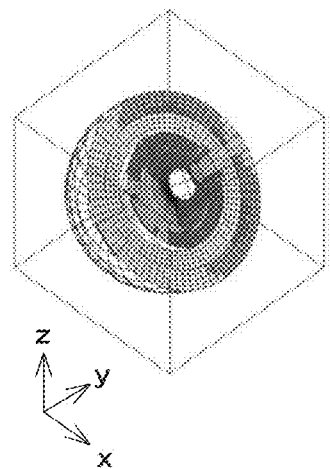
FIG. 21C illustrates a third voltage distribution generated on the diaphragms when the diaphragms are inclined about the y-axis.
Figure 22A:
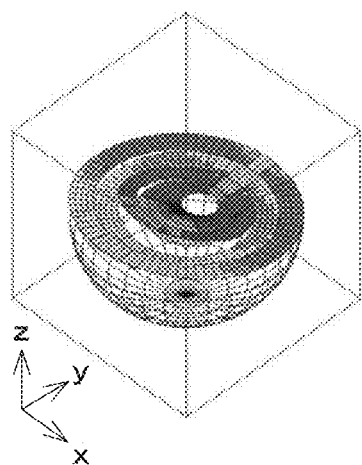
FIG. 22A illustrates a first voltage distribution generated on the diaphragms when the diaphragms are inclined about the axis angled at 45° from the x- and y-axes.
Figure 22B:
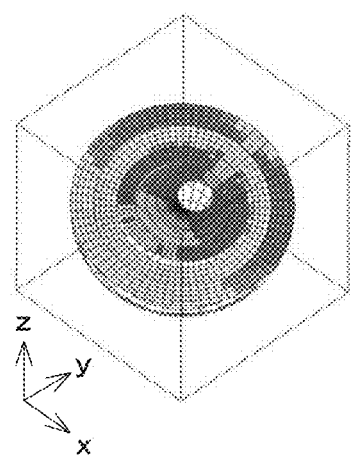
FIG. 22B illustrates a second voltage distribution generated on the diaphragms when the diaphragms are inclined about the axis angled at 45° from the x- and y-axes.
Figure 22C:
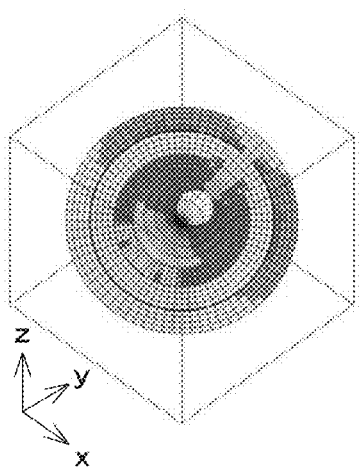
FIG. 22C illustrates a third voltage distribution generated on the diaphragms when the diaphragms are inclined about the axis angled at 45° from the x- and y-axes.

Furthermore, even if the diaphragms 74 to 77 are inclined at 0°, 30°, and 45° about the y-axis and oscillate in the z-axis direction, the voltage distribution generated on the main surfaces 74A to 77A of the diaphragms 74 to 77 does not significantly vary, as illustrated in FIGS. 21A, 21B, and 21C. The same holds true for the case where the diaphragms 74 to 77 are inclined at 0°, 30°, and 45° about the axis angled at 45° from the x- and y-axes and oscillate in the z-axis direction, as illustrated in FIGS. 22A, 22B, and 22C. As is apparent from these voltage distributions, the voltages generated on the main surfaces 74A to 77A of the diaphragms 74 to 77 have the same polarity regardless of the direction of oscillations.

Figure 23:
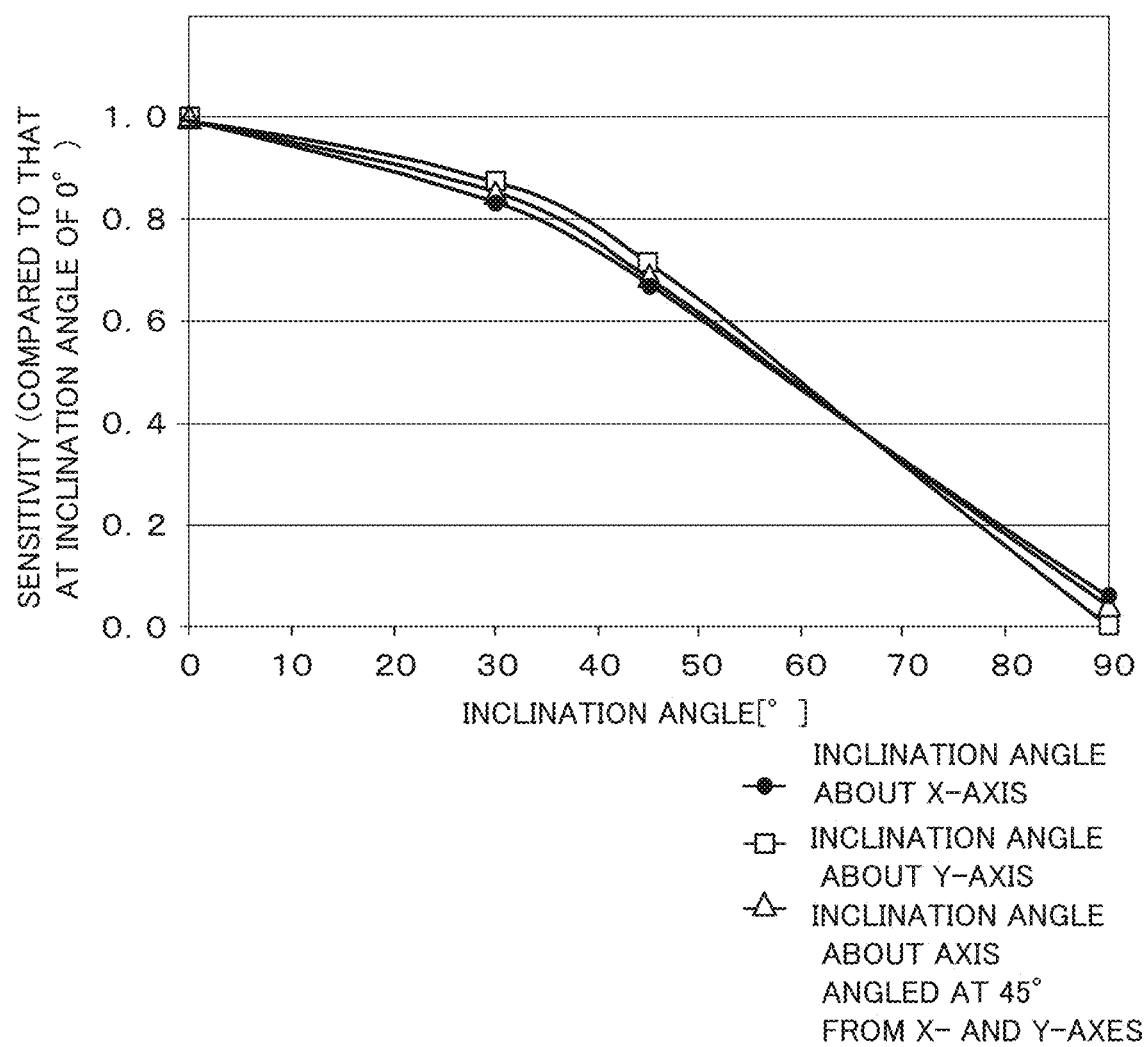
FIG. 23 is a graph illustrating relationships between an inclination angle of the diaphragms and sensitivity.

The relationship between the inclination angle of the diaphragms 74 to 77 about the axis and the sensitivity (the ratio of the power generation amount at a certain inclination angle to the power generation amount at an inclination angle of 0°) was examined. This examination revealed that inclination of the diaphragms 74 to 77 causes a reduction in the generated voltage and that the reduction rate and reduction amount are approximately the same regardless of whether the diaphragms 74 to 77 are inclined about the x-axis, the y-axis, or the axis angled at 45° from the x- and y-axes, as illustrated in FIG. 23. This results demonstrate that the diaphragms 74 to 77 have the same displacement amounts and can generate uniform voltages in all the oscillation directions (regardless of the oscillation directions), because the entire width of each of the diaphragms 74 to 77 is longer than the entire width of the fixed portion 74D.

In this embodiment, the opening of the diaphragm 74 is deviated from the center of the main surface 74A toward the fixed portion 74D. This configuration of the embodiment can increase the displacement amount of the diaphragm 74 and thus increase the generated voltage, in comparison to a diaphragm 74 having a non-eccentric opening.

Although the diaphragms 74 to 77 have circular profiles in the embodiment, this configuration should not be construed as limiting the disclosure. The diaphragms 74 to 77 may also have polygonal profiles, such as square profiles.

Embodiment 6

Then, Embodiment 6 of the disclosure will now be described.

Figure 24:
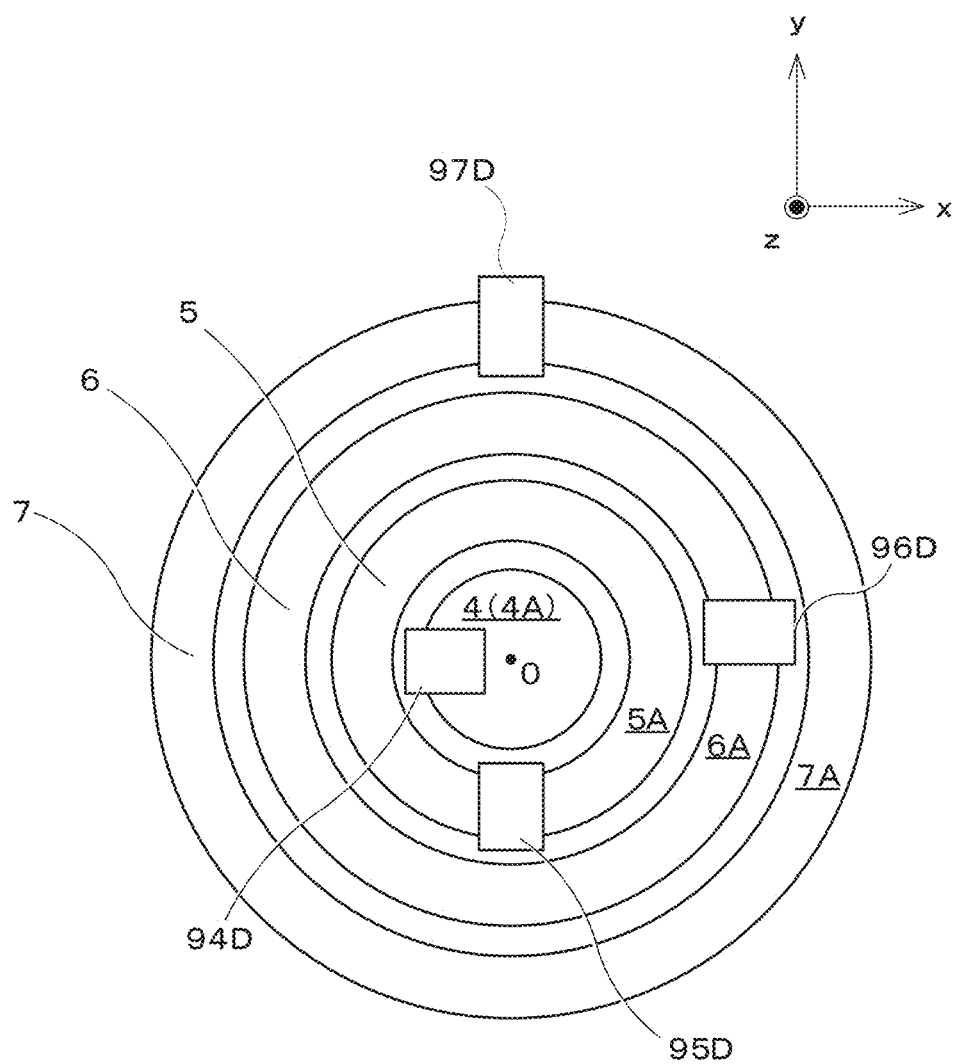
FIG. 24 is a top view of diaphragms of a vibration power generator according to Embodiment 6 of the disclosure.

With reference to FIG. 24, a vibration power generator according to Embodiment 6 is equipped with the diaphragms 4 to 7. In this embodiment, fixing parts 94D, 95D, 96D, and 97D for fixing the respective diaphragms 4 to 7 are separately formed. The fixing part 94D for fixing the diaphragm 4 is disposed at the −x end of the diaphragm 4. The fixing part 95D for fixing the diaphragm 5 is disposed at the −y end of the diaphragm 5. The fixing part 96D for fixing the diaphragm 6 is disposed at the +x end of the diaphragm 6. The fixing part 97D for fixing the diaphragm 7 is disposed at the +y end of the diaphragm 7. That is, the diaphragms 4 to 7 extend from the respective fixing parts 94D, 95D, 96D, and 97D in mutually different directions. These diaphragms 4 to 7 extending (from the respective fixing parts 94D, 95D, 96D, and 97D) in mutually different directions can deal with oscillations in any direction. This configuration can thus equalize the uneven distribution of generated voltage, thereby achieving a uniform power generation amount.

Figure 25A:
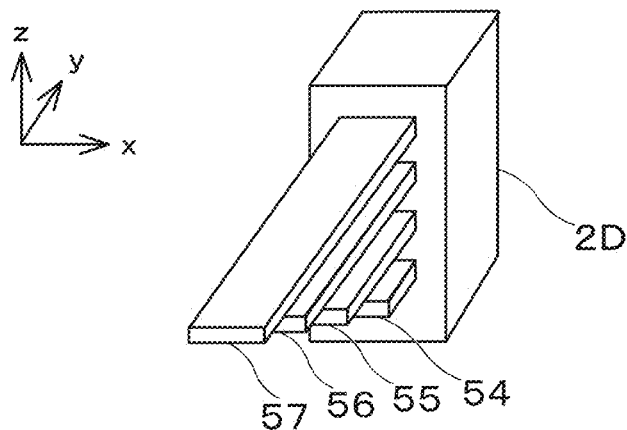
FIG. 25A illustrates diaphragms according to a first example of a third modification.
Figure 25B:
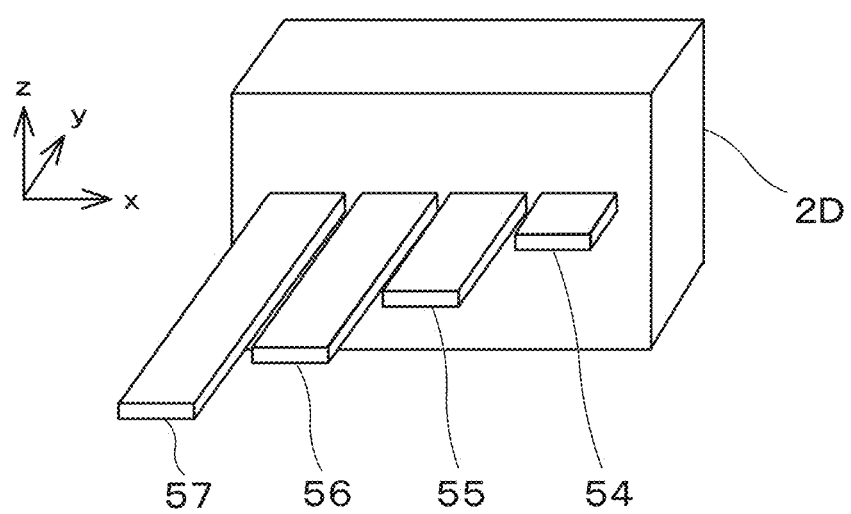
FIG. 25B illustrates diaphragms according to a second example of the third modification.

The bone conduction earphones 1A to 1C and the vibration power generator 1D as vibration devices according to the above-described embodiments may be modified in various manners. For example, the shapes of the diaphragms in the above-described embodiments are mere examples. With reference to FIG. 25A, a vibration device may be equipped with a plurality of cantilever diaphragms 54, 55, 56, and 57 arranged in the thickness direction, for example. The diaphragms 54 to 57 have mutually different lengths and thus have mutually different resonance frequencies. Alternatively, the cantilever diaphragms 54, 55, 56, and 57 may be arranged in the same plane, as illustrated in FIG. 25B.

Figure 26:
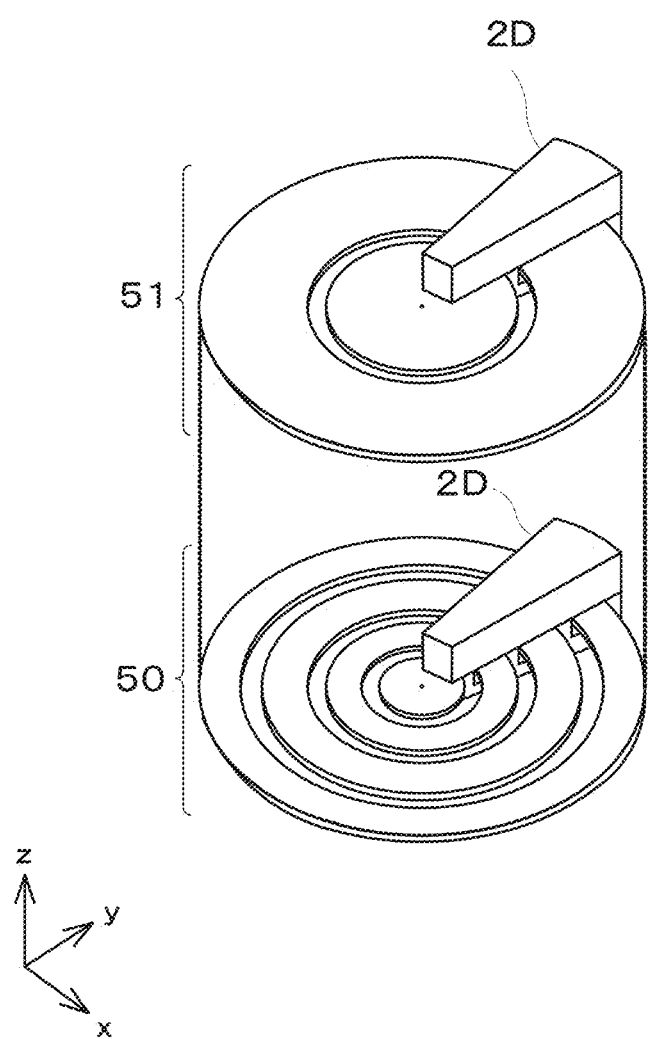
FIG. 26 illustrates diaphragms according to a fourth modification.

Alternatively, with reference to FIG. 26, diaphragm sets 50 and 51, each including diaphragms arranged in the same plane and having mutually different resonance frequencies, may be arranged in the thickness direction. In this configuration, the resonance frequencies of the diaphragms in the diaphragm set 50 may differ from those in the diaphragm set 51. This configuration enables multiple diaphragms having mutually different resonance frequencies to be densely arranged in a limited capacity. The configuration can thus further broaden the frequency band of sound or electric power and can narrow the intervals between the resonance frequencies of the diaphragms, thereby achieving smooth output of sound or electric power.

Figure 27:
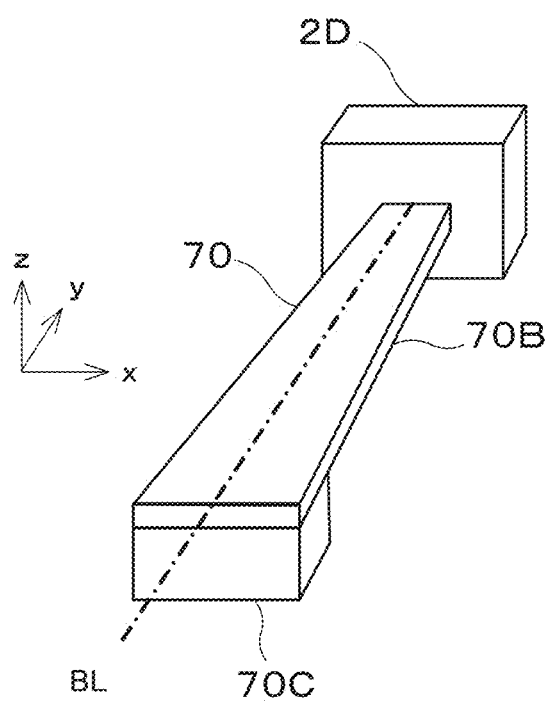
FIG. 27 illustrates a diaphragm according to a fifth modification.

Alternatively, with reference to FIG. 27, a diaphragm 70 may have an arm portion 70B of which the width gradually varies as the distance from the fixing part 2D increases and may be provided with a weight 70C at the end. Alternatively, a diaphragm may have an arm portion of which the thickness gradually varies as the distance from the fixing part 2D increases.

Figure 28:
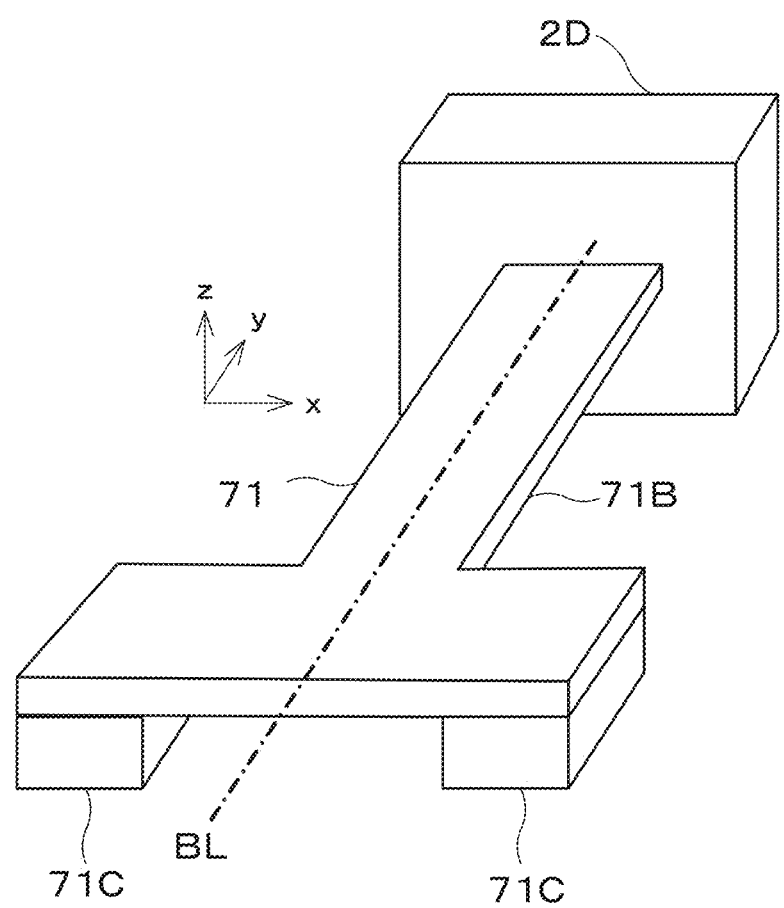
FIG. 28 illustrates a diaphragm according to a sixth modification.

Alternatively, with reference to FIG. 28, a diaphragm 71 may have an arm portion 71B having the end protruding in the horizontal directions and thus have a T-shape. In this configuration, each of the tips of both protrusions can be provided with a weight 71C. This configuration can increase the torsional deformation of the diaphragm 71 and increase the oscillation displacement thereof, thereby enabling higher electric charges to be generated in the piezoelectric layer 40A.

Figure 29:
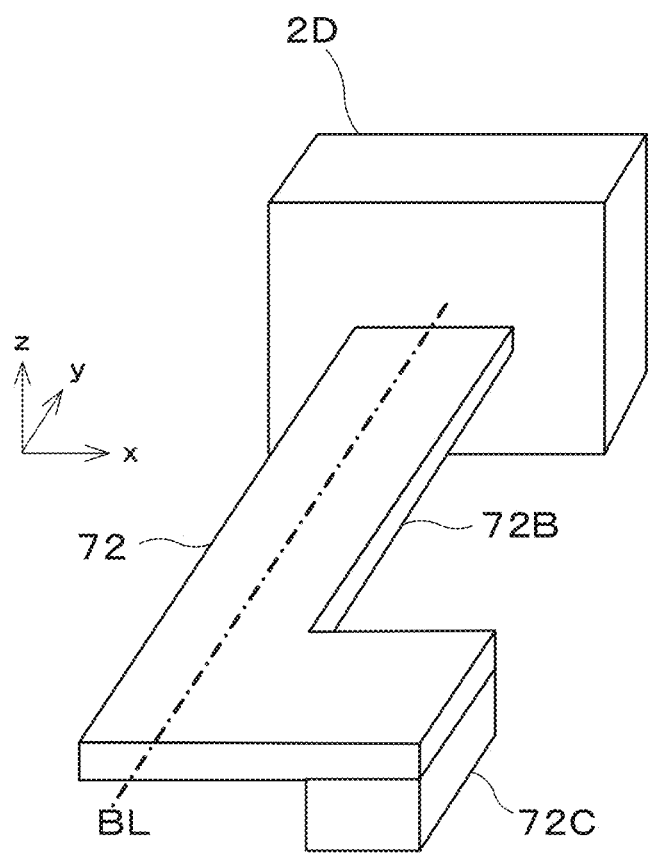
FIG. 29 illustrates a diaphragm according to a seventh modification.

Alternatively, with reference to FIG. 29, a diaphragm 72 may have an arm portion 72B having the bent end and thus have an L-shape. In this configuration, a weight 72C can be installed in a portion that is not on the reference line BL, that is, can be installed at the bent end. This configuration can also increase the torsional deformation of the diaphragm 72 and increase the oscillation displacement thereof, thereby enabling more sound to be transmitted and higher electric power to be generated.

As described above, the weight may be disposed on the center line (reference line BL) extending from the fixing part 2D of the diaphragm through the center thereof, or may be disposed at a position deviated from the center line extending from the fixing part 2D of the diaphragm through the center thereof. In general, the weight 70C should be on the reference line BL, as illustrated in FIG. 27, in generation of acoustic oscillations. In some cases of power generation, the weights 71C and 72C should not be on the reference line BL, as illustrated in FIGS. 28 and 29, so as to generate torsional oscillations, thereby generating higher electric charges.

Although the diaphragms 4 to 7 are arranged in ascending or descending order of the areas of the main surfaces 4A to 7A in the above-described embodiments, this configuration should not be construed as limiting the disclosure. These diaphragms 4 to 7 may be arranged at random.

For example, the diaphragms 4 to 7 may have the main surfaces 4A to 7A having the same area and have mutually different thicknesses. In this configuration, the diaphragms 4 to 7 may be arranged in ascending or descending order of the thicknesses. This configuration can also provide the diaphragms with mutually different resonance frequencies. Alternatively, the diaphragms may have the main surfaces having the same area and have the same thickness but be made of different materials, to provide the diaphragms with mutually different resonance frequencies.

In the above-described embodiments, the diaphragms are fixed to the casing by being held between components, by engagement using the protrusions and recesses, and by contact of the cut-out edges (with contact walls). This configuration, however, should not be construed as limiting the disclosure. For example, the bosses 2E may be replaced with bosses having a polygonal shape to restrict rotation of the diaphragms. Alternatively, two bosses may be arranged adjacent to each other to restrict rotation of the diaphragms. The cut-out edges (or contact walls) do not necessarily have a straight profile. For example, the cut-out edges may have notches like those used in alignment of a wafer.

The diaphragms are only required to have an entire width at least slightly longer than the entire width of the fixing parts. For example, the diaphragms may also have a battledore-like shape. In short, the diaphragms may have any shape according to the disclosure provided that the diaphragms have mutually different resonance frequencies. The configuration in which the entire width of each diaphragm is longer than the entire width of the fixing part can achieve a uniform power generation amount regardless of oscillation directions, for example. In this case, the voltages generated on the entire main surfaces of the diaphragms are required to have the same polarity, as in the diaphragms according to the above-described embodiments.

Some of the diaphragms may have the same resonance frequency. This configuration can increase the frequency response in the vicinity of this resonance frequency, thereby achieving a large power generation amount. That is, a vibration device having a desired frequency response can be configured by adjusting the shapes, thicknesses, weights, and other parameters of the diaphragms and combining diaphragms having the same resonance frequency with diaphragms having different resonance frequencies. It should be noted that the frequency response indicates the frequency characteristics of the oscillation amplitude (displacement amount) of the entire vibration device.

Figure 30:
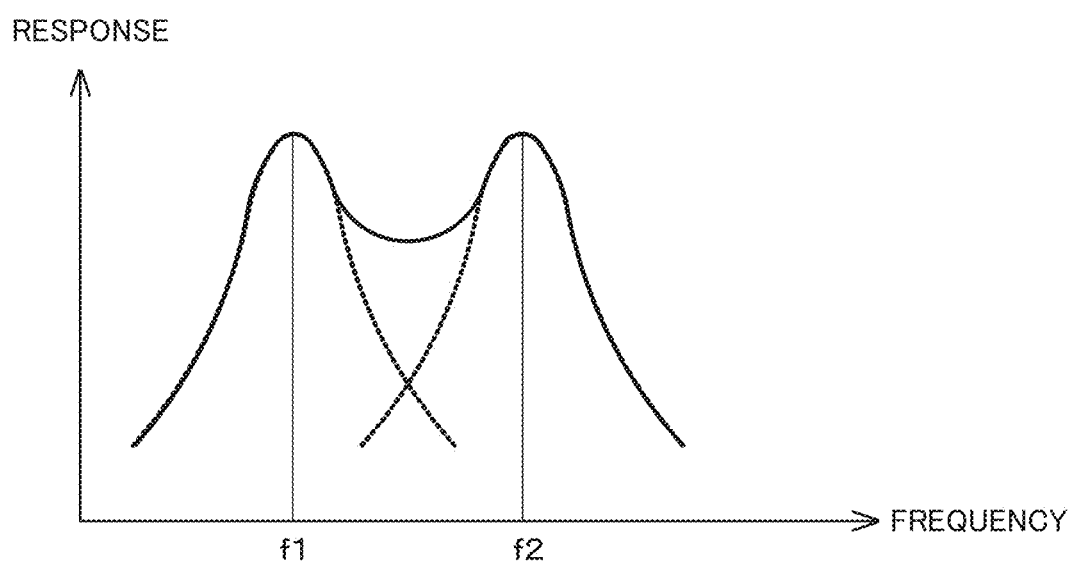
FIG. 30 is a graph illustrating an exemplary frequency response between adjacent resonance frequencies.

A vibration device having a high frequency response in a broad frequency band can be configured by narrowing the interval between the resonance frequencies of adjacent diaphragms. In this vibration device, a reduction in the displacement amounts of the diaphragms is limited within a predetermined range regardless of a change in the oscillation frequency. For example, with reference to FIG. 30, the interval between the adjacent resonance frequencies f1 and f2 of the diaphragms should be determined such that the frequency response (solid line) between the resonance frequencies f1 and f2 is equal to or higher than the frequency response (dotted line) of each of the diaphragms alone. The value equal to or higher than the frequency response indicates that the oscillation amplitude (displacement amount) of the entire vibration device is equal to or larger than the oscillation amplitude (displacement amount) of a comparison target at a certain frequency (for example, at a frequency between the resonance frequencies f1 and f2).

Embodiment 7

Then, Embodiment 7 of the disclosure will now be described.

Figure 31A:
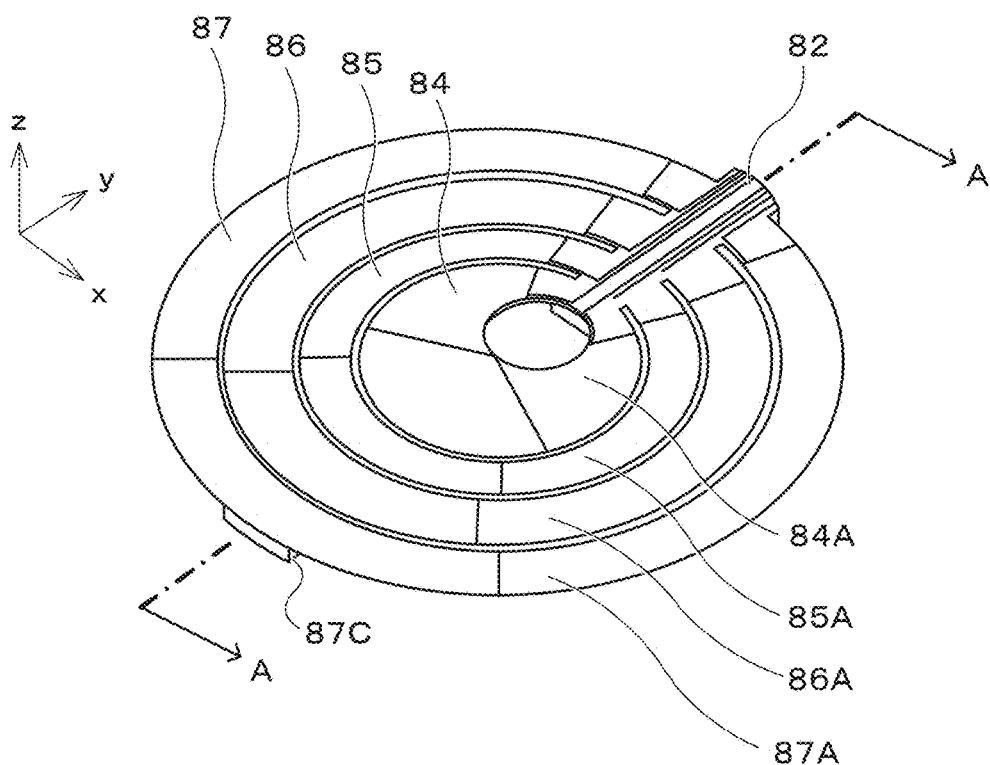
FIG. 31A is a front perspective view of diaphragms of a vibration power generator according to Embodiment 7 of the disclosure.
Figure 31B:
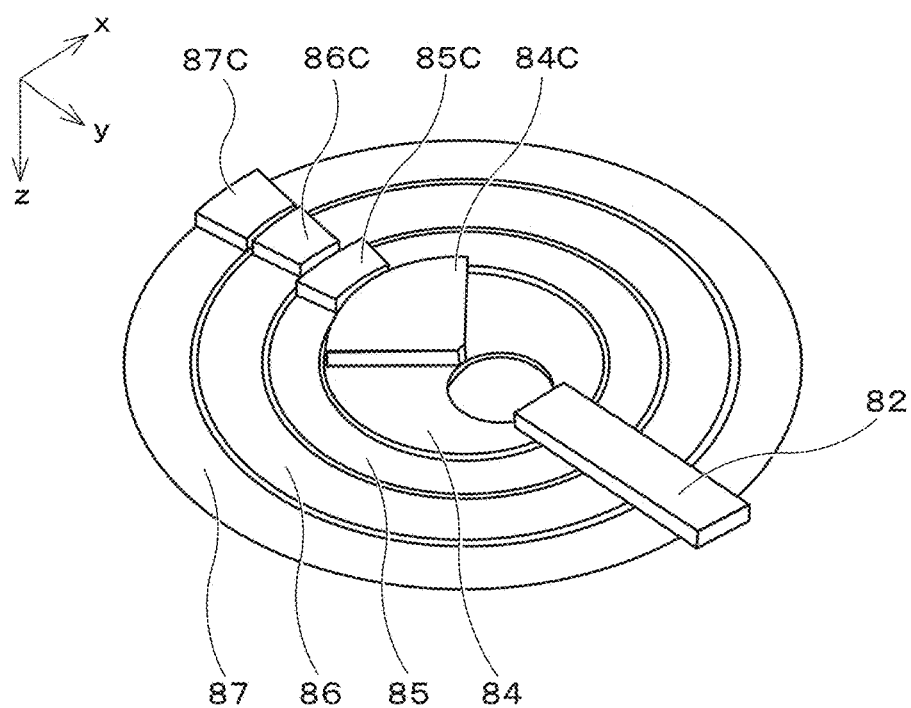
FIG. 31B is a rear perspective view of the diaphragms of the vibration power generator according to Embodiment 7 of the disclosure.

With reference to FIGS. 31A and 31B, a vibration power generator according to the embodiment is equipped with a plurality of diaphragms 84 to 87. The diaphragms 84 to 87 are provided with a joint 82 that couples the diaphragms 84 to 87 to each other by fixing portions of the diaphragms 84 to 87 and that functions as a fixed portion to be fixed to a casing. The joint 82 is integrated with the diaphragms 84 to 87. Each adjacent pair of diaphragms of the diaphragms 84 to 87 define a gap therebetween and can thus independently oscillate regardless of the integration with the joint 82.

The diaphragms 84 to 87 have main surfaces 84A to 87A, respectively. Portions of the main surfaces 84A to 87A are cut out and define openings. In the diaphragm 84, among the diaphragms 84 to 87, the cut-out portion (opening) is eccentrically disposed so as to be deviated from the center of the main surface 84A toward the joint 82 (that is, toward the fixing part).

The diaphragms 84, 85, 86, and 87 are provided with weights 84C, 85C, 86C, and 87C, respectively, on the side of the centers of the main surfaces 84A, 85A, 86A, and 87A opposite to the joint 82. These weights 84C, 85C, 86C, and 87C are installed to finely adjust the resonance frequencies of the diaphragms 84, 85, 86, and 87 to desired frequencies.

Figure 32A:
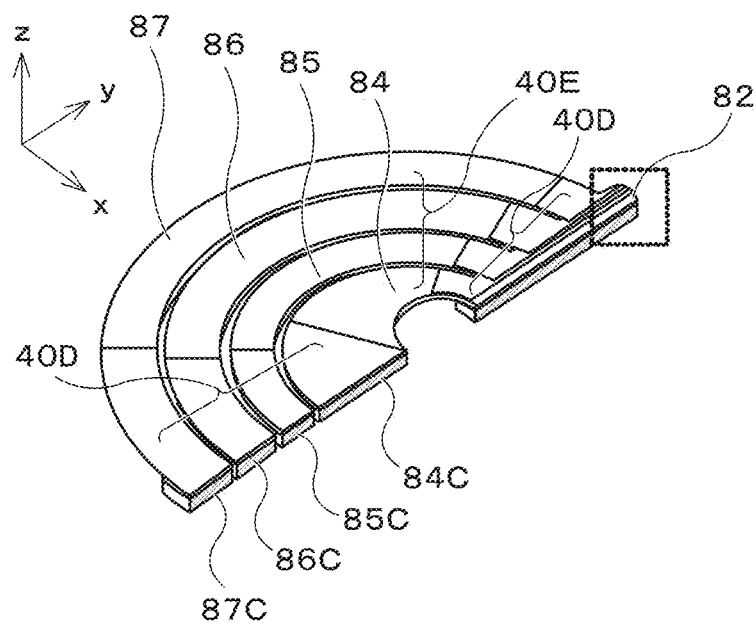
FIG. 32A is a sectional perspective view of the diaphragms illustrated in FIG. 31A.
Figure 32B:
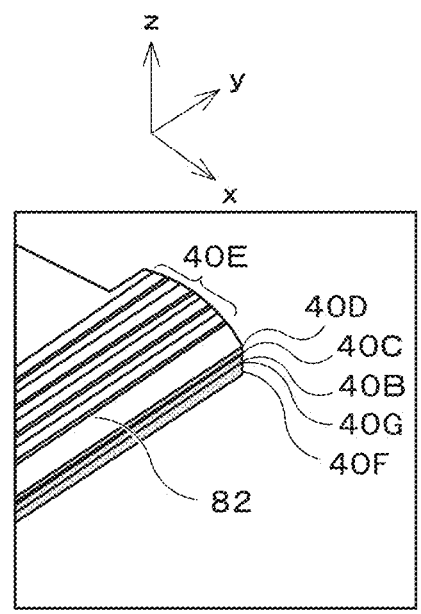
FIG. 32B is an enlarged view of a portion around a joint.

With reference to FIGS. 32A and 32B, each of the diaphragms 84, 85, 86, and 87 is fabricated by layering a base material layer 40B, a lower electrode sublayer 40C, a piezoelectric material sublayer 40D, and an upper electrode sublayer 40E on each other. The joint 82 is fabricated by further layering an Si support layer 40F, a BOX layer (embedded oxide film), and an Si active layer 40G, in addition to the base material layer 40B, the lower electrode sublayer 40C, the piezoelectric material sublayer 40D, and the upper electrode sublayer 40E, as in the above-described embodiments. In this configuration, the upper electrode sublayer 40E is formed only in portions that require the upper electrode sublayer 40E. For example, the upper electrode sublayer 40E is formed in the portions of the diaphragms 84 to 87 except for the portions provided with the weights 84C to 87C (the portions around the weights 84C to 87C) and except for the portions around the joint 82. The portions around the weights 84C to 87C and the portions around the joint 82 do not necessarily need the upper electrode sublayer 40E because these portions are not readily deformed. In the portions around the weights 84C to 87C and the portions around the joint 82, the piezoelectric material sublayer 40D is exposed. The joint 82 is provided with the upper electrode sublayer 40E as a path for transmitting voltage signals output from the diaphragms 84 to 87.

Figure 33:
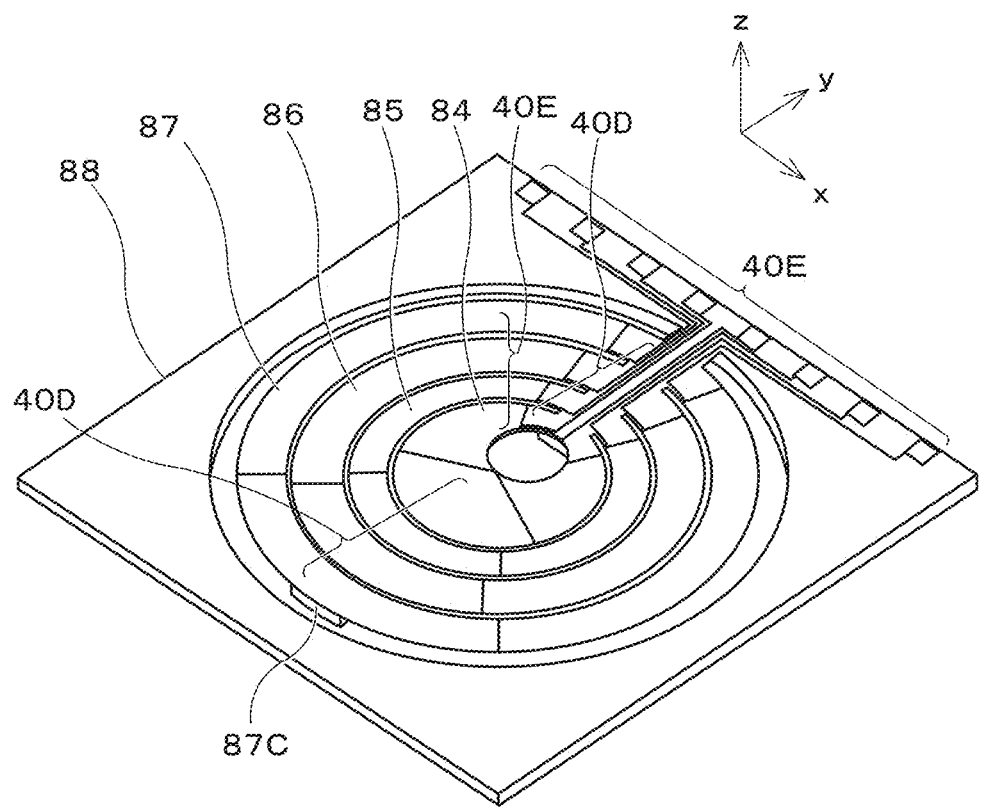
FIG. 33 is a perspective view of the entire configuration of diaphragms provided with a rectangular frame.

The diaphragms 84 to 87 can be fabricated by the MEMS technology (application of semiconductor manufacturing technology) through cutting a rectangular substrate. During this process, the diaphragms 84 to 87 may be formed at the center of the substrate, while the other portions of the substrate may be reserved as a rectangular frame 88 for protecting the diaphragm 84, as illustrated in FIG. 33. A side of the rectangular frame 88 is provided with a rectangular electrode that is composed of the upper electrode sublayer 40E and that outputs voltage signals generated in the diaphragms 84 to 87.

In this embodiment, the diaphragms 84 to 87 are coupled to each other with the joint 82 functioning as the fixed portion and are thus integrated with each other. This configuration can facilitate the management and fabrication of the diaphragms 84 to 87 and enable the diaphragms 84 to 87 to be fixed to the casing at once with an adhesive, for example. The configuration can also simplify the structure for fixing the diaphragms 84 to 87, and expand the contact area between the fixing part and the fixed portion (joint 82), thereby increasing the retaining force of the fixing part.

Embodiment 8

Then, Embodiment 8 of the disclosure will now be described.

Figure 34A:
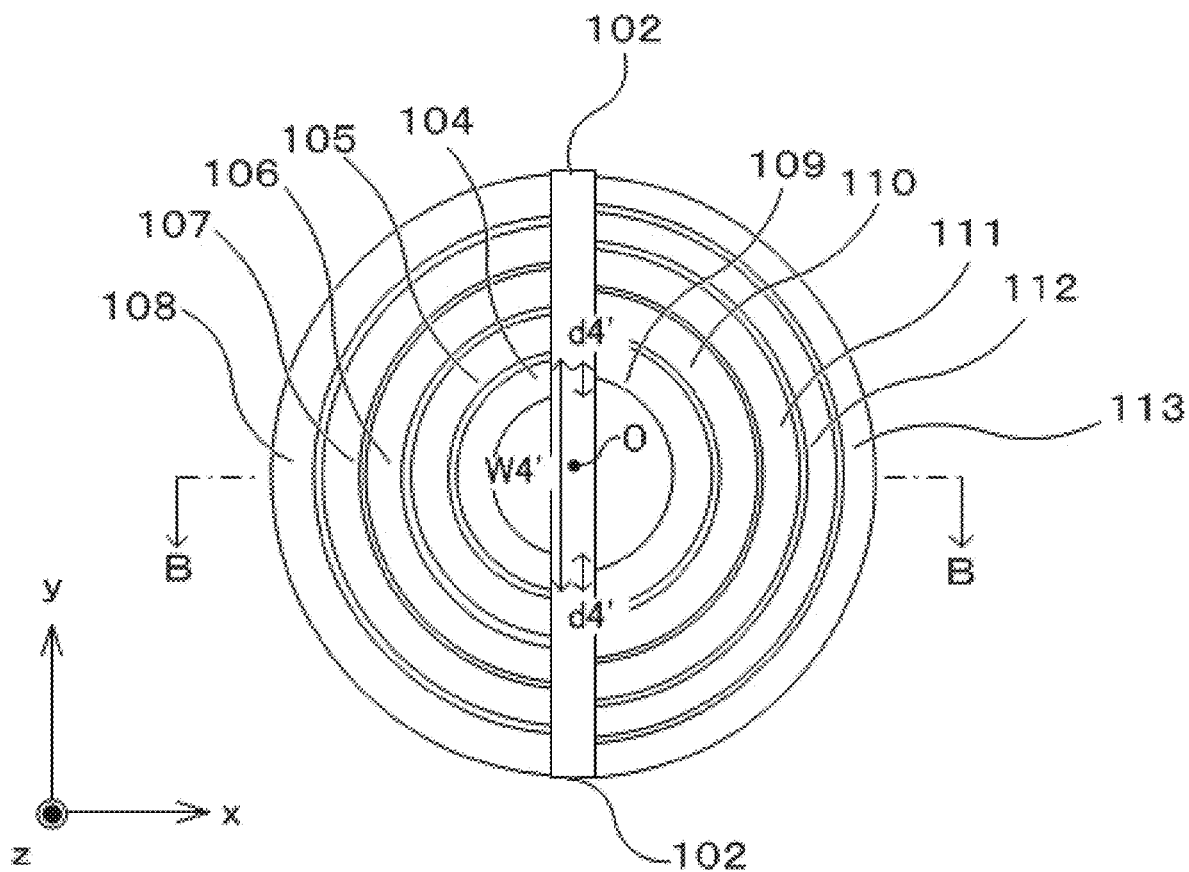
FIG. 34A is a top view of diaphragms of a vibration power generator according to Embodiment 8 of the disclosure.
Figure 34B:
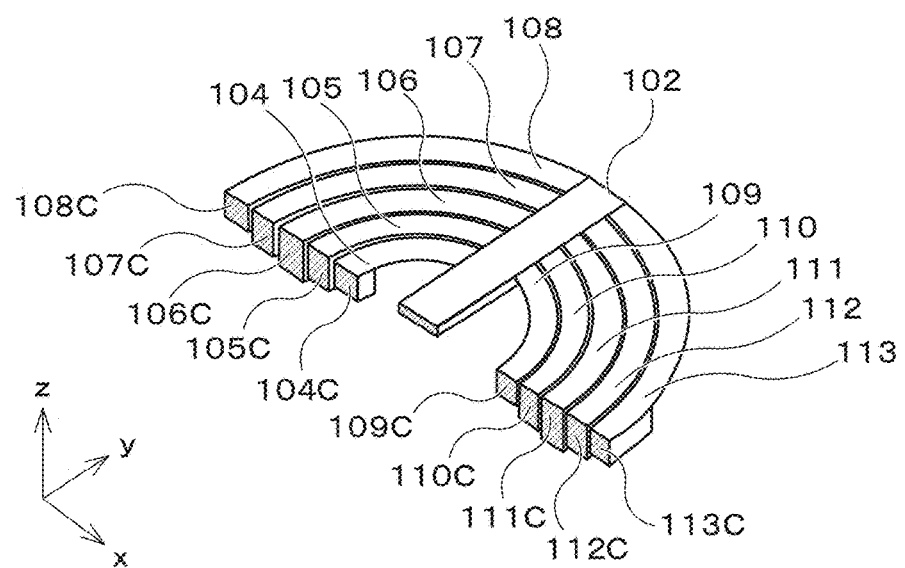
FIG. 34B is a sectional perspective view of the diaphragms taken along line B-B illustrated in FIG. 34A.
Figure 34C:
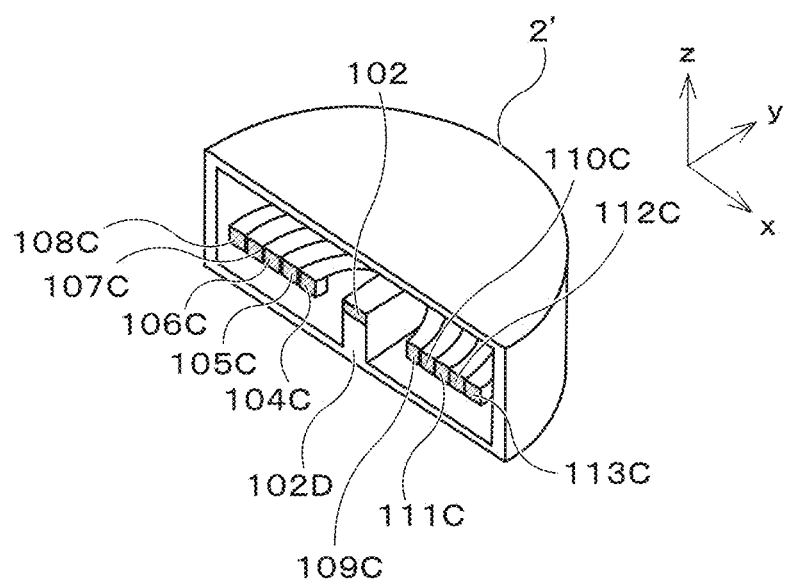
FIG. 34C is a sectional perspective view of the vibration power generator including a casing.

With reference to FIGS. 34A, 34B, and 34C, a vibration power generator according to the embodiment is equipped with a plurality of diaphragms 104 to 113. Each of the diaphragms 104 to 108 and 109 to 113 is an arc plate (a semi-annular plate) curved along the circle having the center at the reference point O. The diaphragms 104 to 108 and 109 to 113 have the same central angle of 180° and are arranged in the radial direction of the circle having the center at the reference point O. The diaphragms 104 to 108 are disposed on the x side of the reference point O, while the diaphragms 109 to 113 are disposed on the +x side of the reference point O. The centers of the diaphragms 104 to 113 are provided with weights 104C to 113C, respectively. The thicknesses (dimensions in the z direction) of the weights 104C to 113C provided to the diaphragms 104 to 113 are adjusted so that the diaphragms 104 to 113 oscillate at desired resonance frequencies. The width of the diaphragms 104 to 108 is longer than the width of the diaphragms 109 to 113 in the radial direction of the circle having the center at the reference point O.

A joint 102 fixes both ends of each of the diaphragms 104 to 108 and 109 to 113, couples the diaphragms 104 to 108 and 109 to 113 to each other, and functions as a fixed portion to be fixed to a fixing part 102D of a casing 2'. The joint 102 extends toward the +y and −y sides (toward the opposite sides) of the reference point O in the radial direction of the circle having the center at the reference point O. The joint 102 is integrated with the diaphragms 104 to 108 and 109 to 113. Each adjacent pair of diaphragms of the diaphragms 104 to 108 or 109 to 113 define a gap therebetween and can thus independently oscillate regardless of the integration with the joint 102. The joint 102 is fixed to the fixing part 102D of the casing 2', as illustrated in FIG. 34C.

In each of the diaphragms 104 to 108 and 109 to 113, the sum of the widths of the fixed ends of the diaphragm (that is, the dimensions of the ends integrated with the fixed portion 102 in the y direction) is shorter than the width of the entire diaphragm in the same direction (y direction). For example, the sum of the widths d4' of the fixed ends of the diaphragm 104 is shorter than the width W4' of the entire diaphragm 104, as illustrated in FIG. 34A. This configuration can increase the oscillation displacement of the diaphragms 104 to 108 and 109 to 113 not only around the y-axis but also around an axis deviated from the y-axis in the xy plane, for example. The vibration power generator according to the embodiment can thus provide a large power generation amount in a wider range of oscillation direction.

In the vibration power generator according to the embodiment, the diaphragms 104 to 108 and 109 to 113 are arc plates having the same central angle of 180° and are arranged in the radial direction of the circle having the center at the reference point O. This configuration can increase the number of diaphragms that can be arranged in a plane having a certain area. The configuration can thus broaden the frequency band providing a large oscillation displacement, and narrow the intervals between the resonance frequencies of the diaphragms 104 to 108 and 109 to 113 to raise the frequency responses between the resonance frequencies.

Figure 35A:
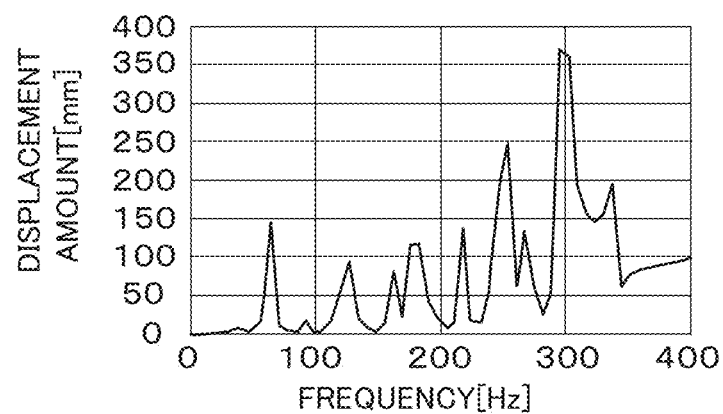
FIG. 35A is a first graph illustrating a frequency response of an oscillatory displacement of diaphragms.
Figure 35B:
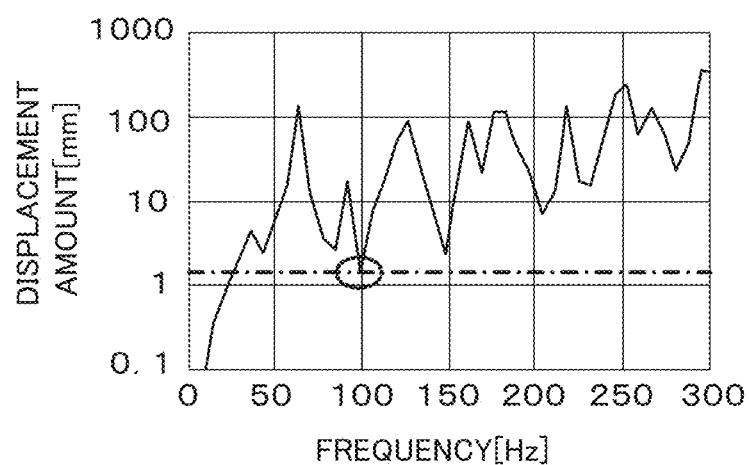
FIG. 35B is a second graph illustrating a frequency response of an oscillatory displacement of the diaphragms.
Figure 35C:
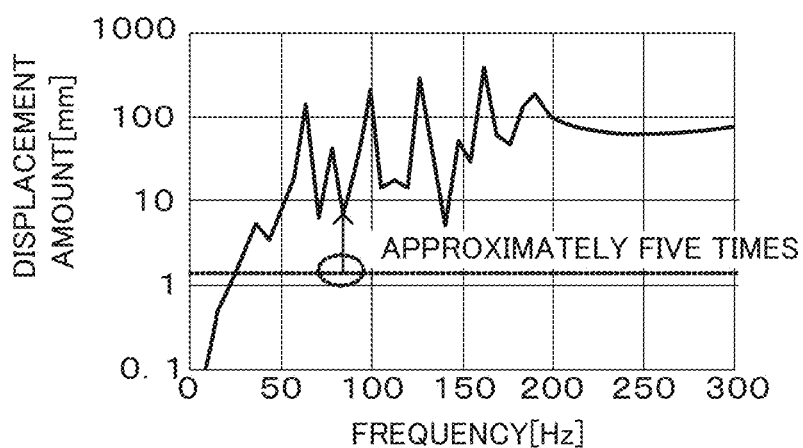
FIG. 35C is a third graph illustrating a frequency response of an oscillatory displacement of the diaphragms.

For example, with reference to FIG. 35A, the diaphragms 104 to 113 can have a larger number of peaks of the resonance frequencies and provide a large oscillation displacement in the frequency band of 50 to 350 Hz. If the diaphragms 104 to 108 have the same width as that of the diaphragms 109 to 113 in the radial direction of the circle having the center at the reference point O and if the weights 104C to 113C have the same thickness, the level of oscillatory displacement falls in the vicinity of 100 Hz, as illustrated in FIG. 35B. In contrast, if the diaphragms 104 to 108 have a width different from that of the diaphragms 109 to 113 in the radial direction of the circle having the center at the reference point O and if the thicknesses of the weights 104C to 113C are adjusted as in the vibration power generator according to the embodiment, then the frequency response in the vicinity of 100 Hz can be raised to approximately five times, for example, as illustrated in FIG. 35C.

The joint 102 may be replaced with three or more radial joints 102 extending from the reference point O in radial directions of the circle having the center at the reference point O. For example, the diaphragms may have a central angle of 120° and three joints 102 may be provided at an interval of 120°.

Embodiment 9

Then, Embodiment 9 of the disclosure will now be described.

Figure 36A:
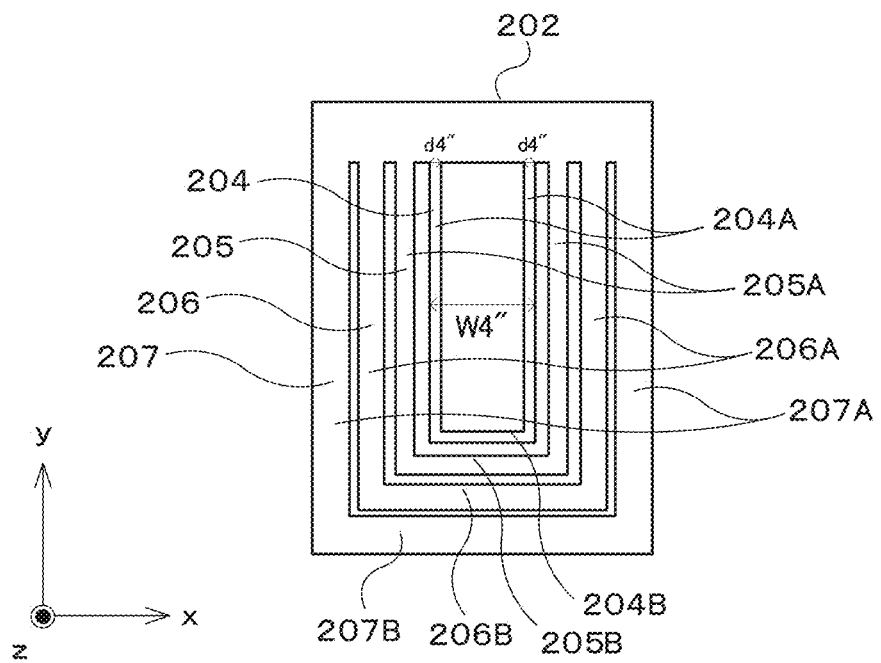
FIG. 36A is a top view of diaphragms of a vibration power generator according to Embodiment 9 of the disclosure.
Figure 36B:
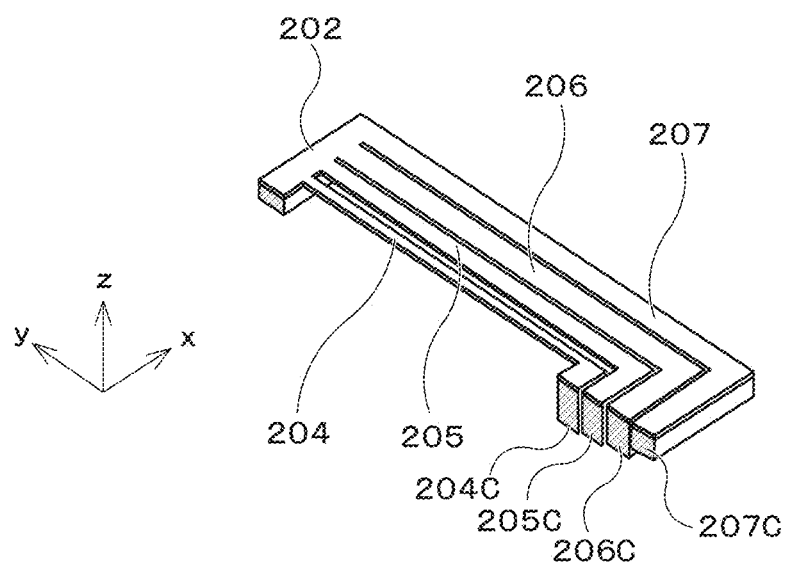
FIG. 36B is a sectional perspective view of the diaphragms illustrated in FIG. 36A.
Figure 36C:
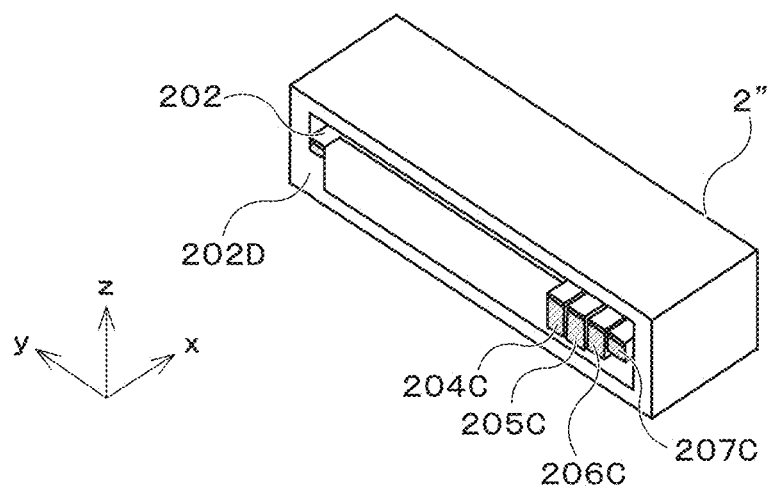
FIG. 36C is a sectional perspective view of the vibration power generator including a casing.

With reference to FIGS. 36A, 36B, and 36C, a vibration power generator according to the embodiment is equipped with a plurality of diaphragms 204 to 207 integrated with each other. The diaphragms 204 to 207 have two first straight sections 204A to 207A, respectively, which extend in parallel to each other in the y direction, and second straight sections 204B to 207B that couple ends of the first straight sections 204A to 207A to each other. The other ends of the first straight sections 204A to 207A are fixed to a fixing part 202D of a casing 2''. The diaphragms 205 to 207 are arranged such that the frames defined by the first straight sections 205A to 207A and the second straight sections 205B to 207B include the other diaphragms 204 to 206. The diaphragms 205 to 207 are integrated with each other in a portion to be fixed by the fixing part 202D of the casing 2", that is, in the fixed portion 202.

From another point of view, the diaphragms 204 to 207 including the fixed portion 202 have a rectangular shape as a whole and has a rectangular opening therein. The opening of the diaphragm 207 surrounds the diaphragm 206, the opening of the diaphragm 206 surrounds the diaphragm 205, and the opening of the diaphragm 205 surrounds the diaphragm 204. In the diaphragms 204 to 207, the widths in the x-axis direction of the pairs of first straight sections 204A to 207A extending in the y-axis direction and the thicknesses of weights 204C to 207C provided to the second straight sections 204B to 207B extending in the x-axis direction are adjusted so that the diaphragms 204 to 207 oscillate at desired resonance frequencies.

In other words, each of the diaphragms 204 to 207 has a rectangular U-shaped plate portion, of which both ends (fixed ends) are integrated with the joint (fixed portion) 202 to be fixed by the fixing part 202D of the casing 2". Each adjacent pair of diaphragms of the diaphragms 204 to 207 define a gap therebetween and can thus independently oscillate regardless of the integration with the joint 202.

In each of the diaphragms 204 to 207, the sum of the widths of the fixed ends of the diaphragm (that is, the dimensions of the ends integrated with the fixed portion 202 in the x direction) is shorter than the width of the entire diaphragm in the same direction (x direction). For example, the sum of the widths d4" of the fixed ends of the diaphragm 204 is shorter than the width W4" of the entire diaphragm 204, as illustrated in FIG. 36A. This configuration can increase the oscillation displacement of the diaphragms 204 to 207 not only around the x-axis but also around an axis deviated from the x-axis in the xy plane, for example. The vibration power generator according to the embodiment can thus provide a large power generation amount in a wider range of oscillation direction.

Figure 37A:
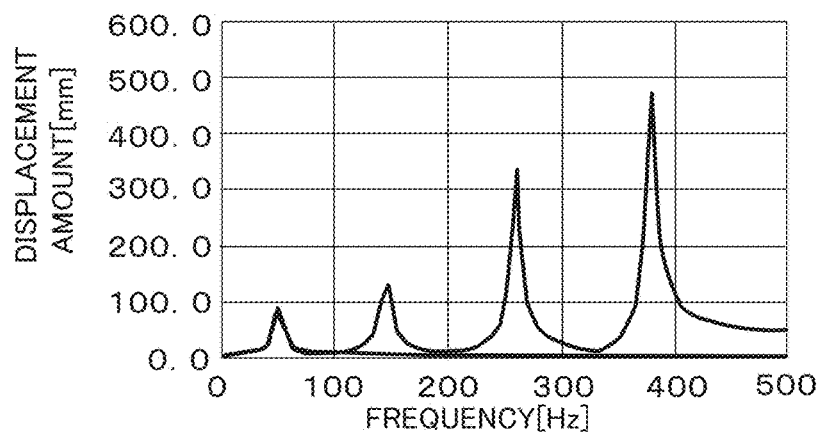
FIG. 37A is a first graph illustrating a frequency response of an oscillatory displacement of diaphragms.
Figure 37B:
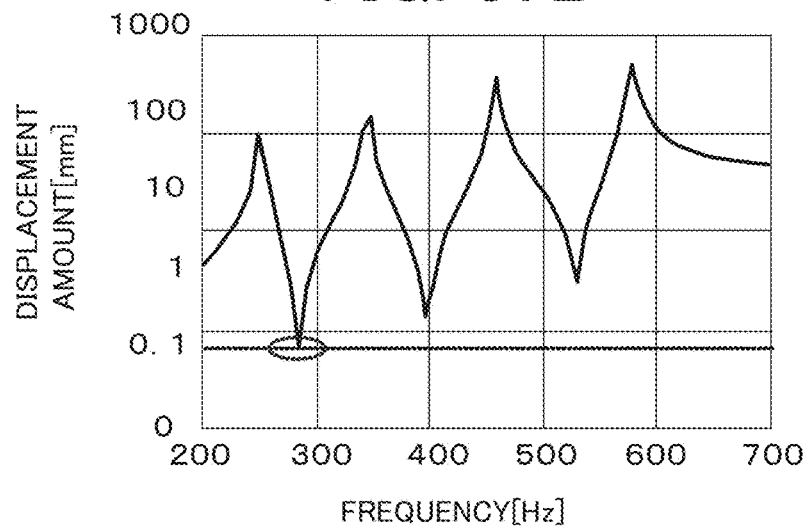
FIG. 37B is a second graph illustrating a frequency response of an oscillatory displacement of the diaphragms.
Figure 37C:
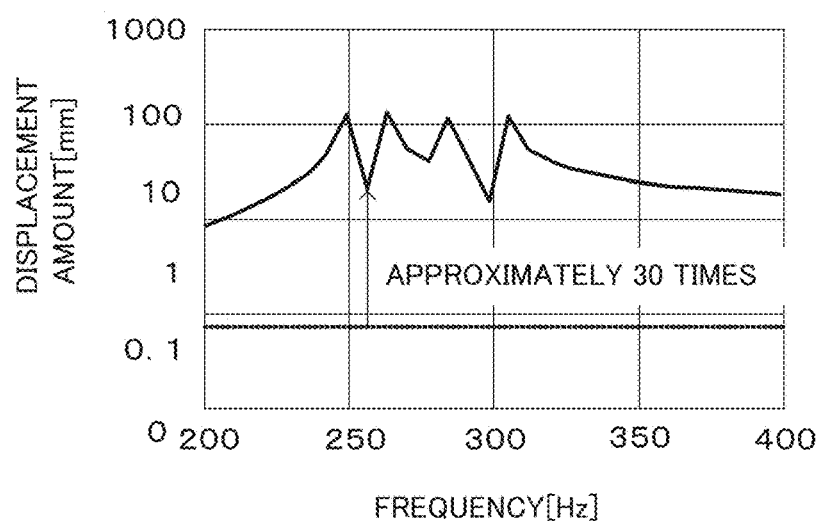
FIG. 37C is a third graph illustrating a frequency response of an oscillatory displacement of the diaphragms.

For example, with reference to FIG. 37A, the diaphragms 204 to 207 can provide a large oscillation displacement in the frequency band of 50 to 400 Hz. If the first straight sections 204A to 207A of the diaphragms 204 to 207 have the same width in the x-axis direction and if the weights 204C to 207C provided to the second straight sections 204B to 207B have the same thickness, the level of oscillatory displacement falls between the lowest resonance frequency and the second lowest resonance frequency, as illustrated in FIG. 37B. In contrast, if the first straight sections 204A to 207A of the diaphragms 204 to 207 have mutually different widths in the x-axis direction and if the weights 204C to 207C provided to the second straight sections 204B to 207B have mutually different thicknesses as in the vibration power generator according to the embodiment, then the frequency response between the lowest resonance frequency and the second lowest resonance frequency can be raised to approximately 30 times, for example, as illustrated in FIG. 37C.

Figure 38:
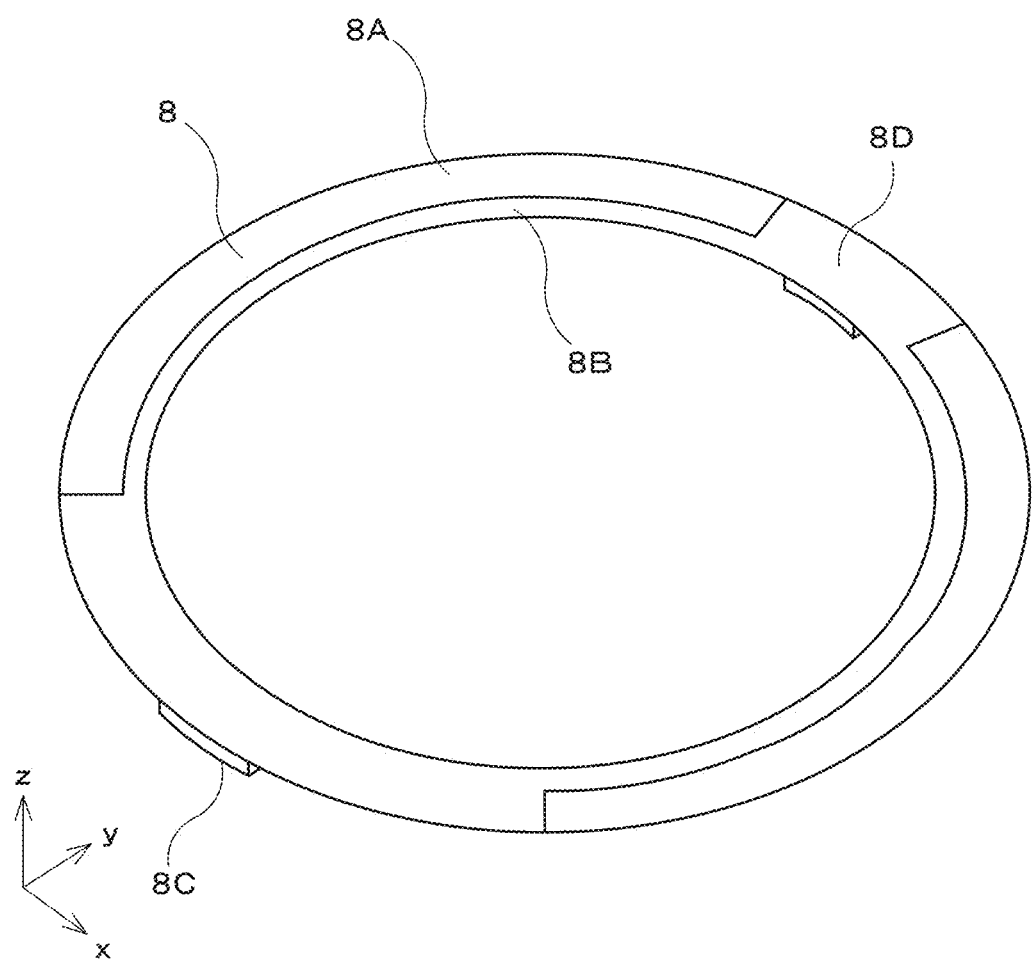
FIG. 38 illustrates a diaphragm according to an eighth modification.

Although each of the vibration devices according to the above-described embodiments is equipped with a plurality of diaphragms having mutually different resonance frequencies, at least one of these diaphragms may be replaced with a diaphragm 8 illustrated in FIG. 38. The diaphragm 8 has an annular shape, is fixed at a single fixed portion 8D, and is provided with a weight 8C at the end opposite to the fixed portion 8D. The diaphragm 8 has a main surface 8A and a jacket 8B (metal plate) is laminated to a portion of the main surface 8A. The jacket 8B is also laminated to the portions of the diaphragm 8 that are not deformed, that is, to the portion provided with the fixed portion 8D and the portion provided with the weight 8C. The jacket 8B extends along the inner periphery of the annular diaphragm 8 in the circumferential direction. This configuration can increase the stress around the boundaries between the areas with the jacket 8B and the areas without the jacket 8B, thereby enabling more electric power to be generated based on oscillations of the diaphragm 8, for example.

Figure 39:
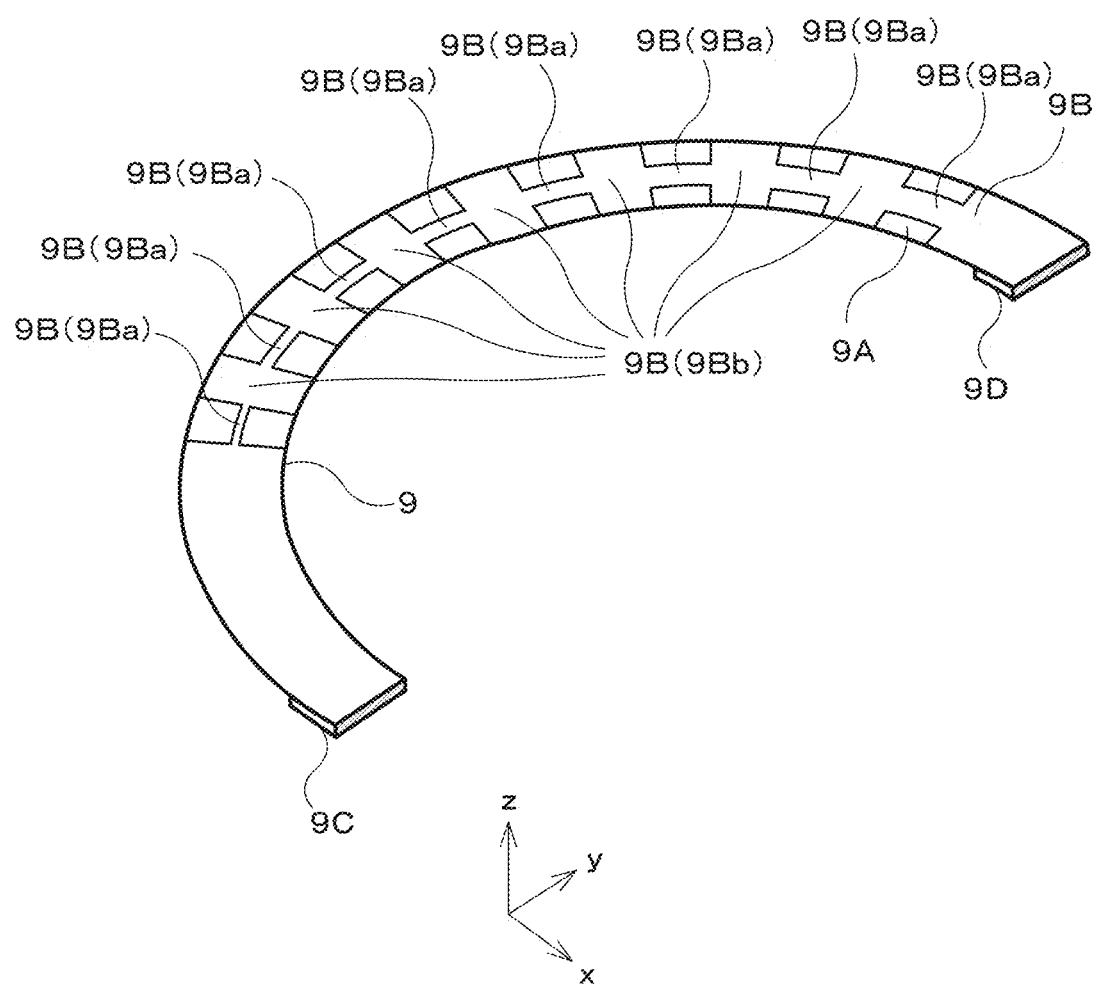
FIG. 39 illustrates a diaphragm according to a ninth modification.

A diaphragm 9 illustrated in FIG. 39 may also be used. FIG. 39 illustrates the diaphragm 9 cut in half. The diaphragm 9 has an annular shape, is fixed at a single fixed portion 9D, and is provided with a weight 9C at the end opposite to the fixed portion 9D. The diaphragm 9 has a main surface 9A to which a jacket 9B (metal plate) is laminated. The jacket 9B extends in the circumferential direction of the diaphragm 9. More specifically, the jacket 9B is composed of narrower sections 9Ba and broader sections 9Bb (having the same width as that of the main surface 9A) that adjoin each other in an alternate manner in the circumferential direction of the diaphragm 9. The sections 9Ba and 9Bb have uneven widths and lengths. The installation of this jacket 9B can further increase the stress around the boundaries between the areas with the jacket 9B and the areas without the jacket 9B, thereby enabling more electric power to be generated based on oscillations of the diaphragm 9, for example.

Figure 40:
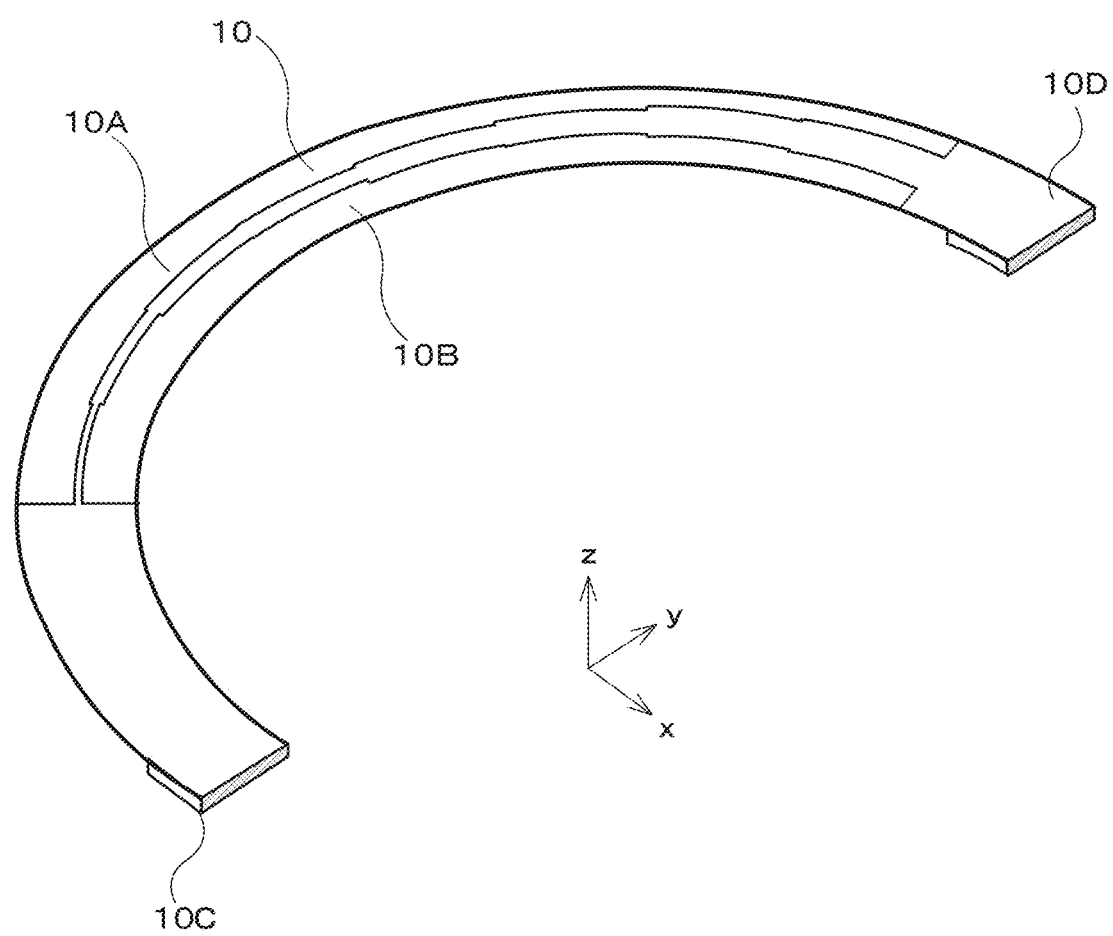
FIG. 40 illustrates a diaphragm according to a tenth modification.

A diaphragm 10 illustrated in FIG. 40 may also be used. FIG. 40 illustrates the diaphragm 10 cut in half. The diaphragm 10 has an annular shape, is fixed at a single fixed portion 10D, and is provided with a weight 10C at the end opposite to the fixed portion 10D. The diaphragm 10 is provided with a jacket 10B (metal plate). The jacket 10B extends in the circumferential direction of the diaphragm 10. As the distance from the fixed portion 10D increases, the width of the jacket 10B gradually decreases. The installation of this jacket 10B can further increase the stress around the boundaries between the areas with the jacket 10B and the areas without the jacket 10B, thereby enabling more electric power to be generated based on oscillations of the diaphragm 10, for example.

Figure 41:
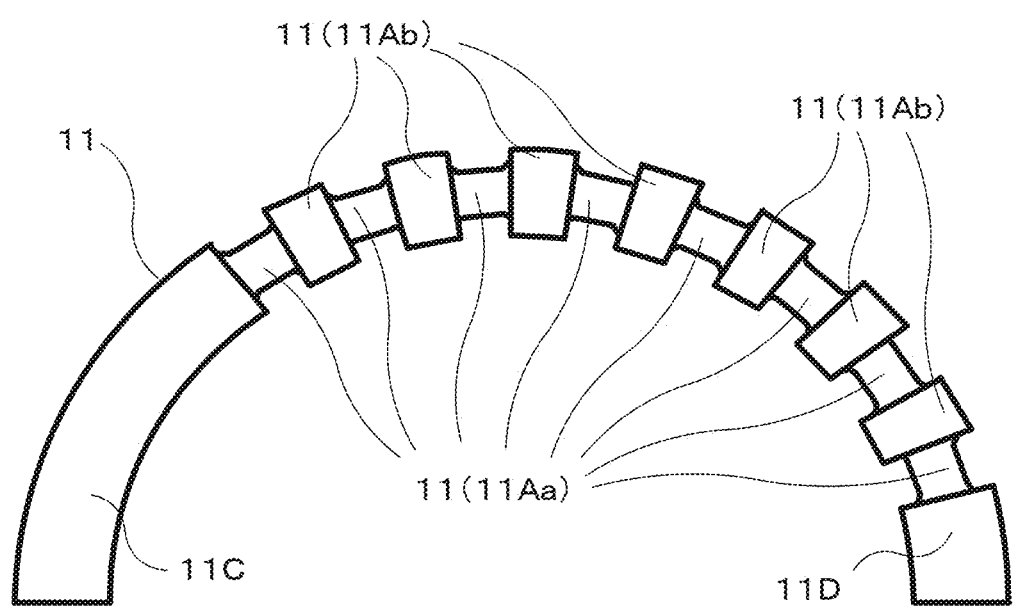
FIG. 41 illustrates a diaphragm according to an eleventh modification.

A diaphragm 11 illustrated in FIG. 41 may also be used. FIG. 41 illustrates the diaphragm 11 cut in half. The diaphragm 11 has an annular shape and is fixed at a single fixed portion 11D. The diaphragm 11 is provided with a weight 11C at the position most distant from the fixed portion 11D. The weight 11C is composed of the remaining silicon layer of the SOI wafer, which is a material of the diaphragm 11. The diaphragm 11 is an annular plate composed of narrower and thinner sections 11Aa (constrictions) and broader and thicker sections 11Ab that adjoin each other in an alternate manner in the circumferential direction of the annular plate. The sections 11Ab are also composed of the remaining silicon layer of the SOI wafer, which is a material of the diaphragm 11. This configuration of the diaphragm 11 can increase the stress around the boundaries between the narrower and thinner sections 11Aa and the broader and thicker sections 11Ab, thereby enabling more electric power to be generated based on oscillations of the diaphragm 11, for example.

Figure 42A:
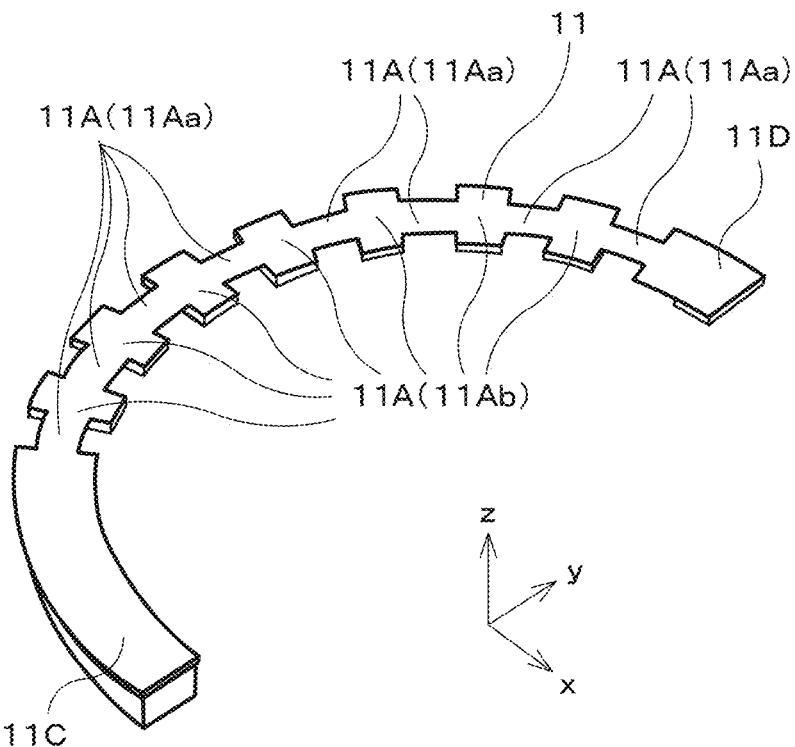
FIG. 42A illustrates a diaphragm according to a twelfth modification as viewed from the front.
Figure 42B:
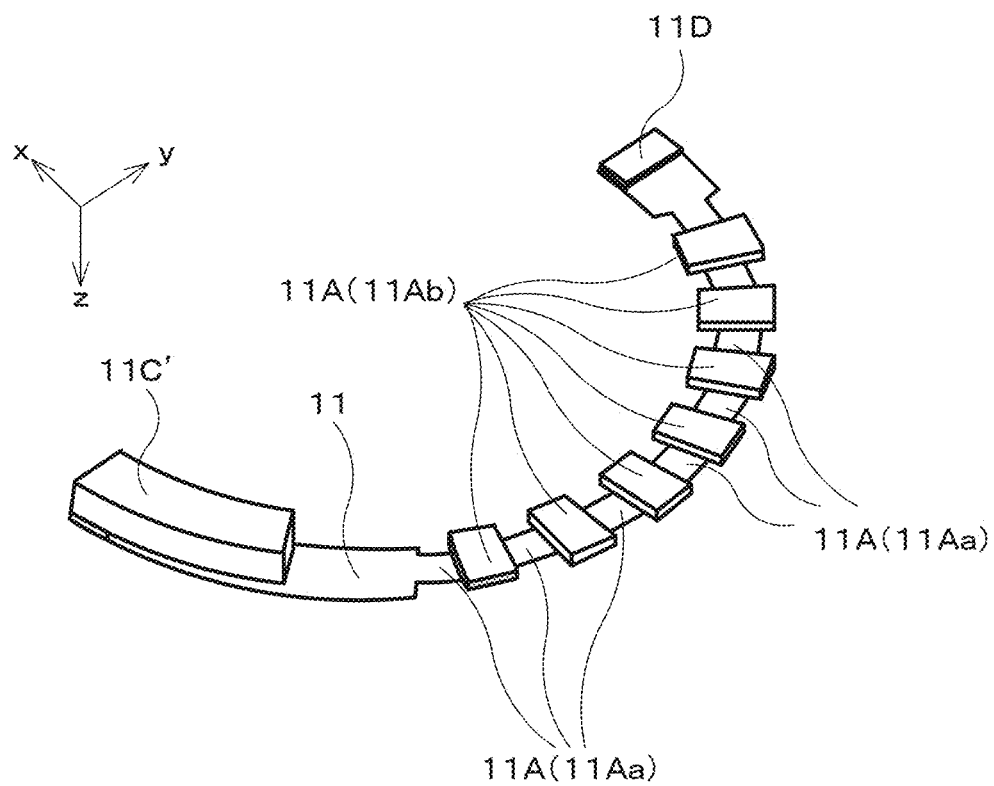
FIG. 42B illustrates the diaphragm according to the twelfth modification as viewed from the rear.
Figure 43:
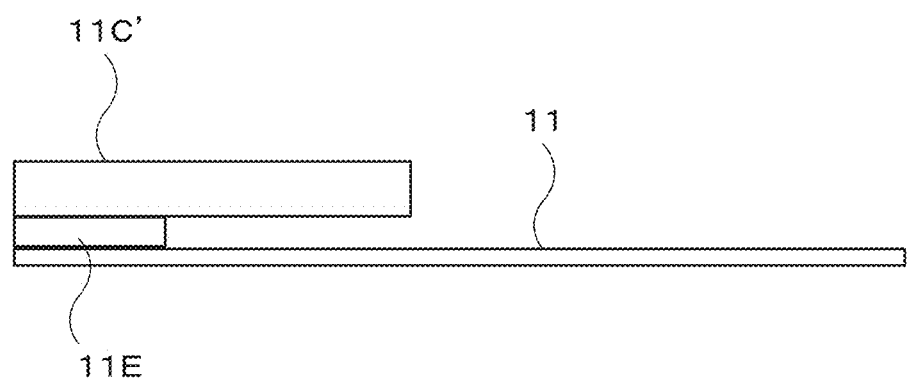
FIG. 43 is an enlarged view of a portion around a weight.
Figure 43:
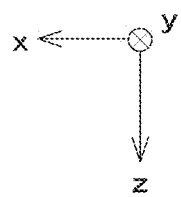

Alternatively, a metal weight 11C' may be provided as in the diaphragm 11 illustrated in FIGS. 42A and 42B. The weight 11C' is provided to the diaphragm 11 at the position most distant from the fixed portion 11D and is coupled to the diaphragm 11 via a silicon layer 11E, as illustrated in FIG. 43. The weight 11C' protrudes from the position coupled to the diaphragm 11 in the direction along and parallel to the diaphragm 11. This configuration can make the weight 11C' heavier to lower the resonance frequencies of the entire diaphragm 11, while ensuring the areas of the portions of the diaphragm 11 that receive a large stress. The configuration can thus enable more electric power to be generated based on oscillations of the diaphragm 11, for example.

The above-described diaphragms including a jacket or having constrictions may also be applied to diaphragms having shapes other than the arc shape.

These vibration devices can serve as the own power sources of various sensors, such as a pressure sensor. For example, the vibration power generator 1D according to the above-described embodiment, for example, can be used as the power source of a sensor for detecting pressure fluctuation to configure a system, in which the vibration power generator 1D, for example, generates electric power based on oscillations caused by pressure fluctuation and the generated electric power causes the sensor to detect the pressure.

Although the diaphragms 4, 5, 6, and 7, for example, are fabricated by the MEMS technology (application of semiconductor manufacturing technology) in the above-described embodiments, this configuration should not be construed as limiting the disclosure. The diaphragms 4, 5, 6, and 7, for example, may also be fabricated by the process explained below. For example, the piezoelectric material sublayer 40D is composed of a piezoelectric ceramic. The piezoelectric ceramic sublayer 40D is provided with the upper electrode sublayer 40E on one surface and is provided with the lower electrode sublayer 40C on the other surface, thereby yielding the piezoelectric layer 40A. The lower electrode sublayer 40C of the piezoelectric layer 40A is further provided with the base material layer 40B composed of silicon. The diaphragms 4, 5, 6, and 7, for example, may be fabricated by this process.

For example, the piezoelectric material sublayer 40D composed of a piezoelectric ceramic has a higher strength (for example, hardness) than that of the piezoelectric material sublayer 40D fabricated by the MEMS technology. If the piezoelectric material sublayer 40D has a relatively high strength and the diaphragms 4, 5, 6, and 7, for example, also have a relatively high strength (for example, hardness), then the diaphragms 4, 5, 6, and 7 do not necessarily require the base material layer 40B onto which the piezoelectric material sublayer 40D (piezoelectric layer 40A) is laminated, for example.

Although the piezoelectric layer 40A laminated onto the base material layer 40B has a single piezoelectric material sublayer 40D in the above-described embodiments, this configuration should not be construed as limiting the disclosure. The piezoelectric layer 40A may also have a plurality of piezoelectric material sublayers 40D.

For example, the piezoelectric layer 40A, which includes the lower electrode sublayer 40C, the piezoelectric material sublayer 40D, and the upper electrode sublayer 40E, may further include another piezoelectric material sublayer 40D and another upper electrode sublayer 40E layered in the order mentioned. That is, the piezoelectric layer 40A may have two piezoelectric material sublayers 40D. Alternatively, for example, the piezoelectric layer 40A, which includes the lower electrode sublayer 40C, the piezoelectric material sublayer 40D, the upper electrode sublayer 40E, the piezoelectric material sublayer 40D, and the upper electrode sublayer 40E, may further include another piezoelectric material sublayer 40D and another upper electrode sublayer 40E layered in the order mentioned. That is, the piezoelectric layer 40A may have three piezoelectric material sublayers 40D.

If each of the diaphragms 4, 5, 6, and 7, for example, has the above-described piezoelectric layer 40A having a plurality of piezoelectric material sublayers 40D, the piezoelectric material sublayers 40D are not necessarily composed of PZT, for example. The piezoelectric material sublayers 40D are only required to be piezoelectric elements that expand and contract in response to application of voltage or that are warped to oscillate in response to an oscillatory force from the outside.

In the above-described Embodiment 5, the thicknesses of the weights 74C to 77C are varied to finely adjust the resonance frequencies of the diaphragms 74 to 77. In the above-described Embodiment 8, the thicknesses of the weights 104C to 113C are also varied to finely adjust the resonance frequencies of the diaphragms 104 to 113. These configurations, however, should not be construed as limiting the disclosure. For example, the weights 74C to 77C or the weights 104C to 113C may be composed of materials having mutually different densities and thus have mutually different weights, and the weights 74C to 77C or the weights 104C to 113C may be provided to the diaphragms 74 to 77 or the diaphragms 104 to 113, to thereby finely adjust the resonance frequencies of the diaphragms 74 to 77 or the diaphragms 104 to 113. In this case, the weights 74C to 77C or the weights 104C to 113C may have similar thicknesses to each other.

Although the diaphragms 84 to 87 are fabricated by cutting a rectangular substrate in the above-described Embodiment 7, this configuration should not be construed as limiting the disclosure. The diaphragms 84 to 87 may also be fabricated by cutting a circular or elliptical substrate, for example.

Each of the diaphragms 104 to 108 and 109 to 113 is an arc plate (a semi-annular plate) curved along the circle having the center at the reference point O in the above-described Embodiment 8, this configuration should not be construed as limiting the disclosure. Each of the diaphragms 104 to 108 and 109 to 113 may be a rectangular U-shaped plate as a whole defined by a rectangular shape including a rectangular opening.

The bone conduction earphones 1A, 1B, and 1C and the vibration power generator 1D according to the above-described embodiments may also be used as a decorative accessory for the smartphone 100 and other devices. For example, the casing 2 and the other casings may have a shape representing a specific character to improve the decorative properties.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2016-150162, filed on Jul. 29, 2016, and Japanese Patent Application No. 2016-210049, filed on Oct. 26, 2016, of which the entirety of the disclosures is incorporated by reference herein.

INDUSTRIAL APPLICABILITY

The disclosure can be applied to bone conduction earphones and vibration power generators. For example, the disclosure can be applied to bone conduction cellular phones, for example, in addition to earphones. The disclosure can also be applied to vibration power generators provided to moving objects, such as humans and vehicles, or provided to objects, such as road surfaces, that receive oscillations from moving objects.

REFERENCE SIGNS LIST 1A, 1B, 1C Bone conduction earphone
1D Vibration power generator
2, 2', 2" Casing
2A, 2B Cover
2C Internal space
2D Fixing part
2E Boss
2F Recess
2G Side wall
3 Signal input unit
3A Audio input terminal
3B Engaging portion
3C Output electrode
4, 4', 4" Diaphragm
4A Main surface
4C Weight
4D Fixed portion
4E Through hole
4G Cut-out edge
5 Diaphragm
5A Main surface
5C Weight
5D Fixed portion
5E Through hole
5G Cut-out edge
Diaphragm
6A Main surface
6C Weight
6D Fixed portion
6E Through hole
6G Cut-out edge
7 Diaphragm
7A Main surface
7C Weight
7D Fixed portion
7E Through hole
7G Cut-out edge
8 Diaphragm
8A Main surface
8B Jacket
8C Weight
8D Fixed portion
9 Diaphragm
9A Main surface
9B Jacket
9B a Section
9Bb Section
9C Weight
9D Fixed portion
10 Diaphragm
10A Main surface
10B Jacket
10C Weight
10D Fixed portion
11 Diaphragm
11A Main surface
11Aa Section (constriction)
11Ab Section
11C, 11C' Weight
11D Fixed portion
11E Silicon layer
15 Diaphragm
15A Main surface
15B Arm portion
15C Weight
16 Diaphragm
16A Main surface
16B Arm portion
16C Weight
17 Diaphragm
17A Main surface
17B Arm portion
17C Weight
24 Diaphragm
24A Main surface
24C Weight
25 Diaphragm
25A Main surface
25B Arm portion
25C Weight
26 Diaphragm
26A Main surface
26B Arm portion
26C Weight
27 Diaphragm
27A Main surface
27B Arm portion
27C Weight
30 Output unit
30A Terminal
34 Diaphragm
34A Main surface
34B Arm portion
34C Weight
34D Fixed portion
35 Diaphragm
35A Main surface
35B Arm portion
35C Weight
35D Fixed portion
36 Diaphragm
36A Main surface
36B Arm portion
36C Weight
36D Fixed portion
37 Diaphragm
37A Main surface
37B Arm portion
37C Weight
37D Fixed portion
38 Diaphragm
38A Main surface
38B Arm portion
38C Weight
38D Fixed portion
40A Piezoelectric layer
40B Base material layer
40C Lower electrode sublayer
40D Piezoelectric material sublayer
40E Upper electrode sublayer
40F Si support layer
40G Si active layer
44, 45, 46, 47 Diaphragm
50 Diaphragm set
51 Diaphragm set 54, 55, 56, 57 Diaphragm
61 Hook
62 Casing
62D Fixing part
63 Cord cable
64 Signal input unit
65 Diaphragm set
70 Diaphragm
70B Arm portion
70C Weight
71 Diaphragm
71B Arm portion
71C Weight
72 Diaphragm
72B Arm portion
72C Weight
74 Diaphragm
74A Main surface
74C Weight
74D Fixed portion
75 Diaphragm
75A Main surface
75C Weight
76 Diaphragm
76A Main surface
76C Weight
77 Diaphragm
77A Main surface
77C Weight
80 Rectifying and smoothing circuit
81 Rechargeable battery
82 Joint
84, 85, 86, 87 Diaphragm
84A, 85A, 86A, 87A Main surface
84C, 85C, 86C, 87C Weight
88 Rectangular frame
94D, 95D, 96D, 97D Fixing part
100 Portable device (smartphone)
101 Earphone jack
102 Joint (fixed portion)
102D Fixing part
104, 105, 106, 107, 108, 109, 110, 111, 112, 113 Diaphragm
104C, 105C, 106C, 107C, 108C, 109C, 110C, 111C, 112C, 113C Weight
202 Joint (fixed portion)
202D Fixing part
204, 205, 206, 207 Diaphragm
204A, 205A, 206A, 207A First straight section
204B, 205B, 206B, 207B Second straight section
204C, 205C, 206C, 207C Weight
h User
S Scallop

The invention claimed is:

1. A vibration device comprising:
   diaphragms each having a flat-plate shape and including laminated layers that include a piezoelectric layer and being warped to oscillate due to expansion and contraction of the piezoelectric layer or due to an oscillatory force from outside, the diaphragms having mutually different resonance frequencies; and
   a casing comprising an internal space for accommodating the diaphragms and a fixing part for fixing a portion of each of the diaphragms, the casing being able to transmit oscillations between the diaphragms and the outside via the fixing part.

2. The vibration device according to claim 1, wherein the diaphragms include a diaphragm having an entire width longer than an entire width of a fixed end of the diaphragm in a direction orthogonal to a direction extending from the fixing part toward a center of the diaphragm in a main surface of the diaphragm, the fixed end being fixed by the fixing part.

3. A vibration device comprising:
   diaphragms, arranged in a same plane, each diaphragm including laminated layers that include a piezoelectric layer and being warped to oscillate due to expansion and contraction of the piezoelectric layer or due to an oscillatory force from outside, the diaphragms having mutually different resonance frequencies; and
   a casing comprising an internal space for accommodating the diaphragms and a fixing part for fixing a portion of each of the diaphragms, the casing being able to transmit oscillations between the diaphragms and the outside via the fixing part.

4. The vibration device according to claim 3, wherein the diaphragms include a diaphragm having a main surface a part of which is cut out to define an opening, the opening surrounding another diaphragm.

5. The vibration device according to claim 4, wherein the diaphragms are concentrically arranged.

6. The vibration device according to claim 4, wherein the opening is deviated from a center of the main surface toward the fixing part.

7. The vibration device according to claim 3, wherein the diaphragms are arc plates having a same central angle, the diaphragms being arranged in a radial direction of a circle centered on a reference point, and
   each of the diaphragms is fixed by the fixing part at both ends.

8. The vibration device according to claim 7, wherein the diaphragms have portions to be fixed by the fixing part, the portions extending oppositely or radially from the reference point.

9. The vibration device according to claim 3, wherein each of the diaphragms comprises:
   two first straight sections extending parallel to each other, each of the first straight sections being fixed by the fixing part at one end; and
   a second straight section coupling another end of one of the two first straight sections to another end of the other of the two first straight sections, and
   the diaphragms are arranged such that a diaphragm is included inside a frame defined by the first straight sections and the second straight section of another diaphragm.

10. The vibration device according to claim 3, wherein the diaphragms are integrated with each other at portions to be fixed by the fixing part.

11. The vibration device according to claim 1, wherein the diaphragms are arranged in a thickness direction.

12. The vibration device according to claim 11, wherein the diaphragms have a same external dimension.

13. The vibration device according to claim 3, wherein the diaphragms are arranged in ascending or descending order of areas of main surfaces of the diaphragms.

14. The vibration device according to claim 3, wherein the diaphragms are arranged in ascending or descending order of thicknesses of the diaphragms.

15. The vibration device according to claim 3, wherein each of the diaphragms is provided with a weight.

16. The vibration device according to claim 15, wherein the diaphragms are arranged in ascending or descending order of weights of the weights provided to the respective diaphragms.

17. The vibration device according to claim 15, wherein the weight is disposed on a center line in each of the diaphragms, the center line extending from the fixing part through the center of the diaphragm.

18. The vibration device according to claim 15, wherein the weight is disposed at a position deviated from a center line in each of the diaphragms, the center line extending from the fixing part through the center of the diaphragm.

19. The vibration device according to claim 1, further comprising:
an input-output unit that receives a voltage signal output by an external device and applies the voltage signal to the respective piezoelectric layers of the diaphragms or that extracts, as current, electric charges generated in the piezoelectric layers.

20. A vibration device comprising:
diaphragms each including laminated layers that include a piezoelectric layer and being warped to oscillate due to expansion and contraction of the piezoelectric layer or due to an oscillatory force from outside, the diaphragms having mutually different resonance frequencies;
a casing comprising an internal space for accommodating the diaphragms and a fixing part for fixing a portion of each of the diaphragms, the casing being able to transmit oscillations between the diaphragms and the outside via the fixing part; and,
an input-output unit that receives a voltage signal output by an external device and applies the voltage signal to the respective piezoelectric layers of the diaphragms or that extracts, as current, electric charges generated in the piezoelectric layers, wherein the fixing part is disposed at a position opposite to the input-output unit.

21. The vibration device according to claim 20, wherein at least one of the diaphragms has a cut-out portion that faces the input-output unit.

22. The vibration device according to claim 21, wherein at least one of the diaphragms has a main surface having a C-shape, a U-shape, or a recessed shape.

23. A vibration device according to claim 1, further comprising:
another diaphragm having a same resonance frequency as one of the diaphragms.

24. A vibration device according to claim 1, wherein intervals between the resonance frequencies of the diaphragms are determined such that a frequency response between adjacent resonance frequencies exceeds a frequency response of a single diaphragm.

25. A vibration device according to claim 1, wherein a metal plate is laminated to a portion of a main surface of at least one of the diaphragms.

26. The vibration device according to claim 25, wherein the diaphragm to which the metal plate is laminated has an annular shape, and
the metal plate extends along an inner periphery of the diaphragm in a circumferential direction.

27. The vibration device according to claim 25, wherein the diaphragm to which the metal plate is laminated has an annular shape, and
the metal plate includes narrower sections and broader sections that adjoin each other in an alternate manner in a circumferential direction of the diaphragm.

28. The vibration device according to claim 25, wherein the diaphragm to which the metal plate is laminated has an annular shape,
the metal plate extends in a circumferential direction of the diaphragm, and
the metal plate has a width that decreases as a distance from the fixing part increases.

29. The vibration device according to claim 1, wherein at least one of the diaphragms is an annular plate including narrower and thinner sections and broader and thicker sections that adjoin each other in an alternate manner in a circumferential direction of the diaphragm.

30. The vibration device according to claim 29, wherein the at least one of the diaphragms is coupled to a metal weight at a position most distant from the fixing part.

31. The vibration device according to claim 30, wherein the metal weight protrudes from the position coupled to the diaphragm in a direction along and parallel to the diaphragm.

* * * * *